(12) United States Patent
Gale et al.

(10) Patent No.: US 6,452,577 B1
(45) Date of Patent: Sep. 17, 2002

(54) MICRODISPLAY VIEWER

(75) Inventors: Ronald P. Gale, Sharon; Gary J. Swanson, Lexington, both of MA (US)

(73) Assignee: Kopin Corporation, Taunton, MA (US)

( * ) Notice: Subject to any disclaimer, the term of this patent is extended or adjusted under 35 U.S.C. 154(b) by 0 days.

(21) Appl. No.: 09/434,726

(22) Filed: Nov. 5, 1999

Related U.S. Application Data

(60) Provisional application No. 60/107,426, filed on Nov. 6, 1998, and provisional application No. 60/137,555, filed on Jun. 4, 1999.

(51) Int. Cl.⁷ .............................................. G09G 3/36
(52) U.S. Cl. ............................. 345/87; 345/7; 345/84; 345/100; 345/102; 345/905; 349/58; 349/61; 349/62; 349/64; 349/67; 357/630; 357/361
(58) Field of Search ..................... 345/7, 8, 84, 87, 345/100, 102, 905; 349/58, 61, 62, 64, 67; 359/630, 631

(56) References Cited

U.S. PATENT DOCUMENTS

| | | | |
|---|---|---|---|
| 4,636,866 A | 1/1987 | Hattori | 358/236 |
| 4,864,390 A * | 9/1989 | McKechnie et al. | 348/751 |
| 5,206,749 A | 4/1993 | Zavracky et al. | 359/59 |
| 5,317,236 A | 5/1994 | Zavracky et al. | 315/169.3 |
| 5,343,262 A | 8/1994 | Park | 353/119 |
| 5,416,496 A | 5/1995 | Wood | 345/102 |
| 5,467,154 A | 11/1995 | Gale et al. | 353/119 |
| 5,528,397 A | 6/1996 | Zavracky et al. | 359/59 |
| 5,666,133 A | 9/1997 | Matsuo et al. | 345/100 |
| 5,673,059 A | 9/1997 | Zavracky et al. | 345/8 |
| 5,691,783 A | 11/1997 | Numao et al. | 349/48 |
| 5,748,160 A | 5/1998 | Shieh et al. | 345/82 |
| 5,815,126 A | 9/1998 | Fan et al. | 345/8 |
| 5,867,795 A | 2/1999 | Novis et al. | 455/566 |
| 5,889,567 A | 3/1999 | Swanson et al. | 349/62 |
| 5,905,478 A * | 5/1999 | Hildebrand et al. | 345/8 |
| 5,943,171 A * | 8/1999 | Budd et al. | 359/631 |
| 5,973,845 A * | 10/1999 | Hildebrand et al. | 359/630 |
| 6,005,649 A * | 12/1999 | Krusius et al. | 349/73 |
| 6,055,110 A * | 4/2000 | Kintz et al. | 359/637 |
| 6,057,966 A * | 5/2000 | Caroll et al. | 359/630 |
| 6,073,034 A | 6/2000 | Jacobsen et al. | 455/566 |
| 6,094,181 A * | 7/2000 | Hildebrand et al. | 345/8 |
| 6,224,216 B1 * | 5/2001 | Parker et al. | 353/31 |
| 6,232,937 B1 * | 5/2001 | Jacobsen et al. | 345/87 |

FOREIGN PATENT DOCUMENTS

| | | |
|---|---|---|
| EP | 0 005 245 A1 | 4/1979 |
| EP | 763763 A1 | 9/1996 |
| GB | 2149554 A | 6/1985 |
| JP | 62-271569 | 11/1987 |
| JP | 2-154232 | 6/1990 |
| WO | WO 97/09653 | 9/1996 |
| WO | WO 98/19435 | 5/1998 |
| WO | WO 98/27538 | 6/1998 |

OTHER PUBLICATIONS

Lemme, H., "Displays under the magnifying glass," Elektronik 47(21) :pp. 69–71, 72–77, 8, Oct. 13, 1998, XP–00085729.

Abstract, Japanese Application No. JP 84192184, filed Sep. 13, 1984.

* cited by examiner

Primary Examiner—Bipin Shalwala
Assistant Examiner—Vincent E. Kovalick
(74) Attorney, Agent, or Firm—Hamilton, Brook, Smith & Reynolds, P.C.

(57) ABSTRACT

A display viewer has an electronic display including an array of pixel electrodes having an area of less than 400 mm². A light source can be used to illuminate the array of pixel electrodes of a liquid crystal display in a preferred embodiment. The viewer has a lens system that enlarges an image on the display and can also include a mirror that reflects the enlarged image from the lens. A display viewer in a preferred embodiment has a planar mirror and a viewing screen. The viewing screen has a diffuser and a Fresnel lens through which the image is viewed.

41 Claims, 20 Drawing Sheets

MICRODISPLAY VIEWER

RELATED APPLICATION

This application claims the benefit of U.S. Provisional Application No. 60/107,426, filed Nov. 6, 1998, and U.S. Provisional Application No. 60/137,555, filed Jun. 4, 1999, the entire teachings of the above applications being incorporated herein by reference.

BACKGROUND OF THE INVENTION

This invention is a device for displaying information from a microdisplay in an enlarged format. It is recognized that microdisplays can be used in hand-held devices such as pagers, video and digital cameras, cellular telephones, and card readers. The user holds the system in proximity to their eye such that they view the microdisplay through an optical system which magnifies the image on the microdisplay. Small area displays can be made using different technologies including transmission or reflective liquid crystal displays, light emitting diode (LED) array displays, electroluminescent displays, digital micro-mirror displays and field emission displays.

SUMMARY OF THE INVENTION

It is a desire to have an image which is viewable by a user at a distance greater than a few inches from the device containing an electronic display. The present invention produces a magnified image from a small area display that is directed along an optical path to viewing surface optical elements readable at a greater distance.

A preferred embodiment of the invention relates to a microdisplay viewer having an electronic display and an optical system that enlarges the image for viewing within an arm's length of the user, for example. A lens enlarges the image produced on the microdisplay. A mirror reflects the enlarged image from the lens. In a preferred embodiment, the display is an active matrix liquid crystal display with an array of at least 75,000 pixel electrodes and an active area of less than 400 mm$^2$. A light source illuminates the array of pixel electrodes.

The hand-held microdisplay unit, in a preferred embodiment, has a curved mirror and a display device having a lens system positioned between the mirror and the display. The curved mirror can be a concave mirror, preferably a spherical mirror, that reflects the light from the lens system and directs the image along a viewing axis.

The viewer in another preferred embodiment has a planar mirror and a viewing screen. In a preferred embodiment, the screen is a Fresnel lens. The lens allows redirection of light to the user's eye. The viewing screen can have a diffuser and a Fresnel lens, for example, through which the image is viewed. The image of the microdisplay is projected through the lens system to the mirror and to the viewing screen.

In a preferred embodiment, a light pipe is interposed between the light source and the liquid crystal display for compressing the light from the light source to fill the liquid crystal display and increasing uniformity of the light. The light source is at least one light emitting diode. A condenser lens is interposed between the light pipe and the liquid crystal display for maximizing collection of the light into the display.

A preferred embodiment of the viewer can include a mechanical assembly that can be manually actuated between a "closed" or storage position and an "open" or operating position. In the storage position, the display image cannot be seen by the user, however, the viewer is in a more compact state, occupying less than 600 cm$^3$, providing for ease of transport or storage. In the operating position, the viewer housing is opened to provide the enlarged optical path needed for viewing the enlarged image from the display.

The active matrix display can be a transmissive or reflective liquid crystal display, or other electronic display having a small area and sufficient resolution.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
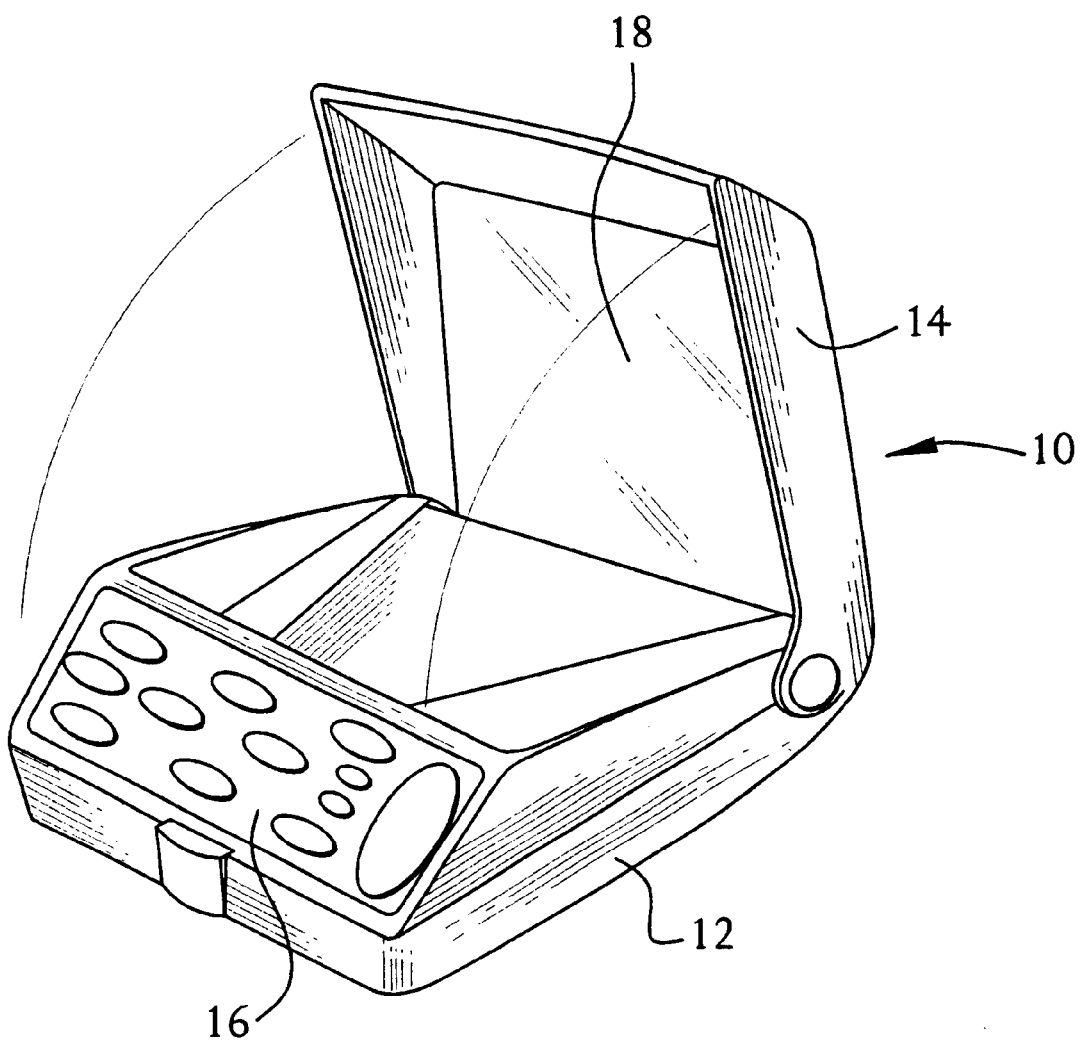
FIG. 1 is a perspective view of a hand-held viewer according to the invention in an open position.

In the figures, like numbers are used to indicate like elements. FIG. 1 shows a hand-held flip-up microdisplay viewer of the invention and is generally referred to as 10.

The viewer 10 has a base 12 and a lid 14. The lid 14 is shown in an open position therein granting access to a control panel 16 and showing a curved mirror 18. The control panel 16 is for selecting and projecting an image as described below.

Figure 2:
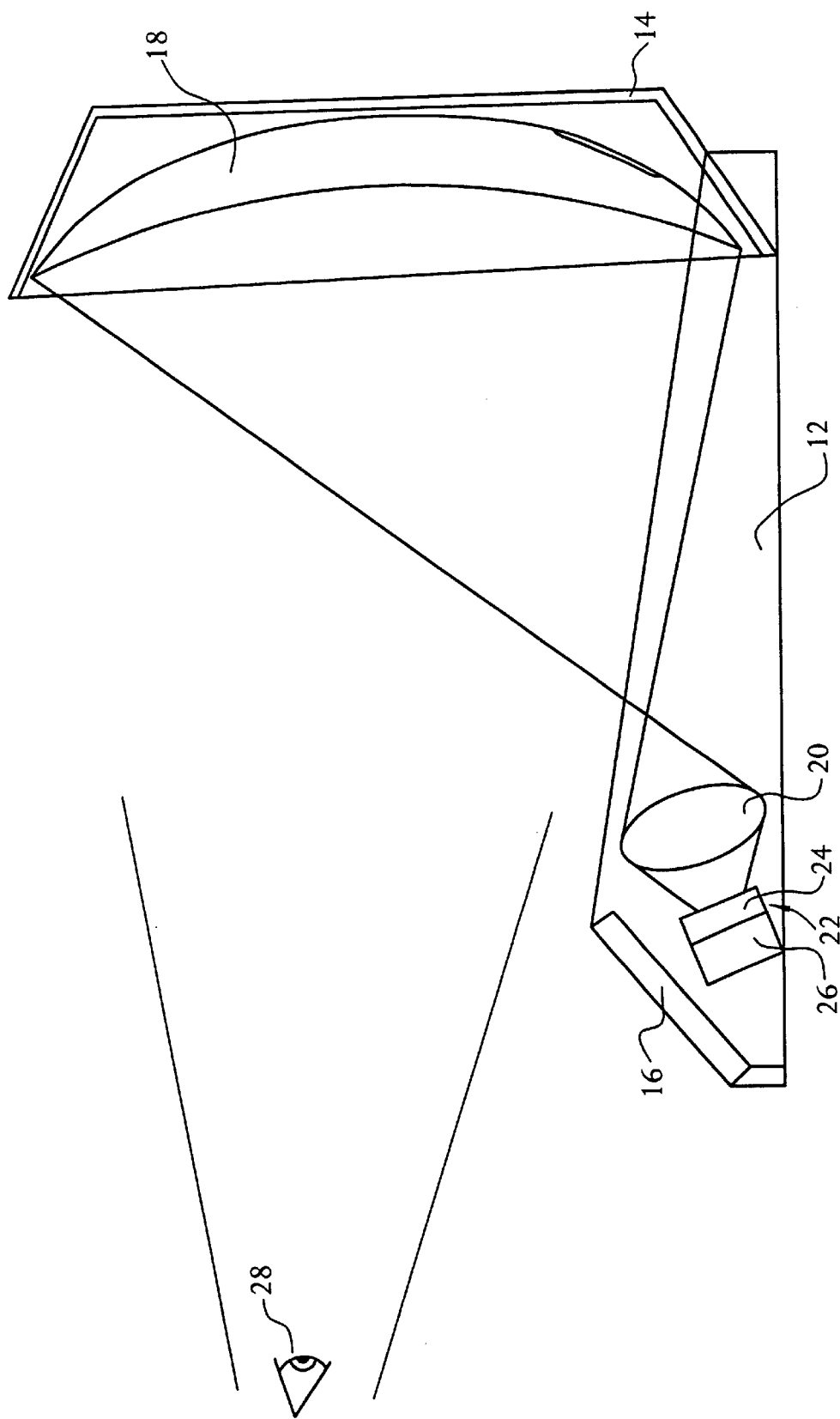
FIG. 2 is a side sectional view of the hand-held viewer in the open position.

FIG. 2 shows a side-sectional view of the hand-held viewer 10 in an open position. An image is projected on the curved mirror 18 from an image on a microdisplay 22 passing through a lens 20. The microdisplay 22 has a display 24 and a backlight 26. In a preferred embodiment the microdisplay 22 is a color sequential display. Color sequential microdisplays are further described in U.S. Pat. No. 5,673,059, the entire teachings of which are incorporated herein by reference.

The microdisplay 22, the image source, is positioned relative to the curved mirror 18, such that the image is projected on the mirror 18. In a preferred embodiment the mirror 18 is a concave spherical mirror segment of a larger hemispherical mirror structure. The mirror 18 is held stationary at some predetermined distance above and in front of microdisplay 22 by the lid 14. When the mirror 18 is fully aluminized, preferably the front surface, it magnifies the image received from the lens and reflects it toward a user's eye 28 located at some distance from the viewer. The user's eye 28 is represented by the schematic eye 28.

Figure 3:
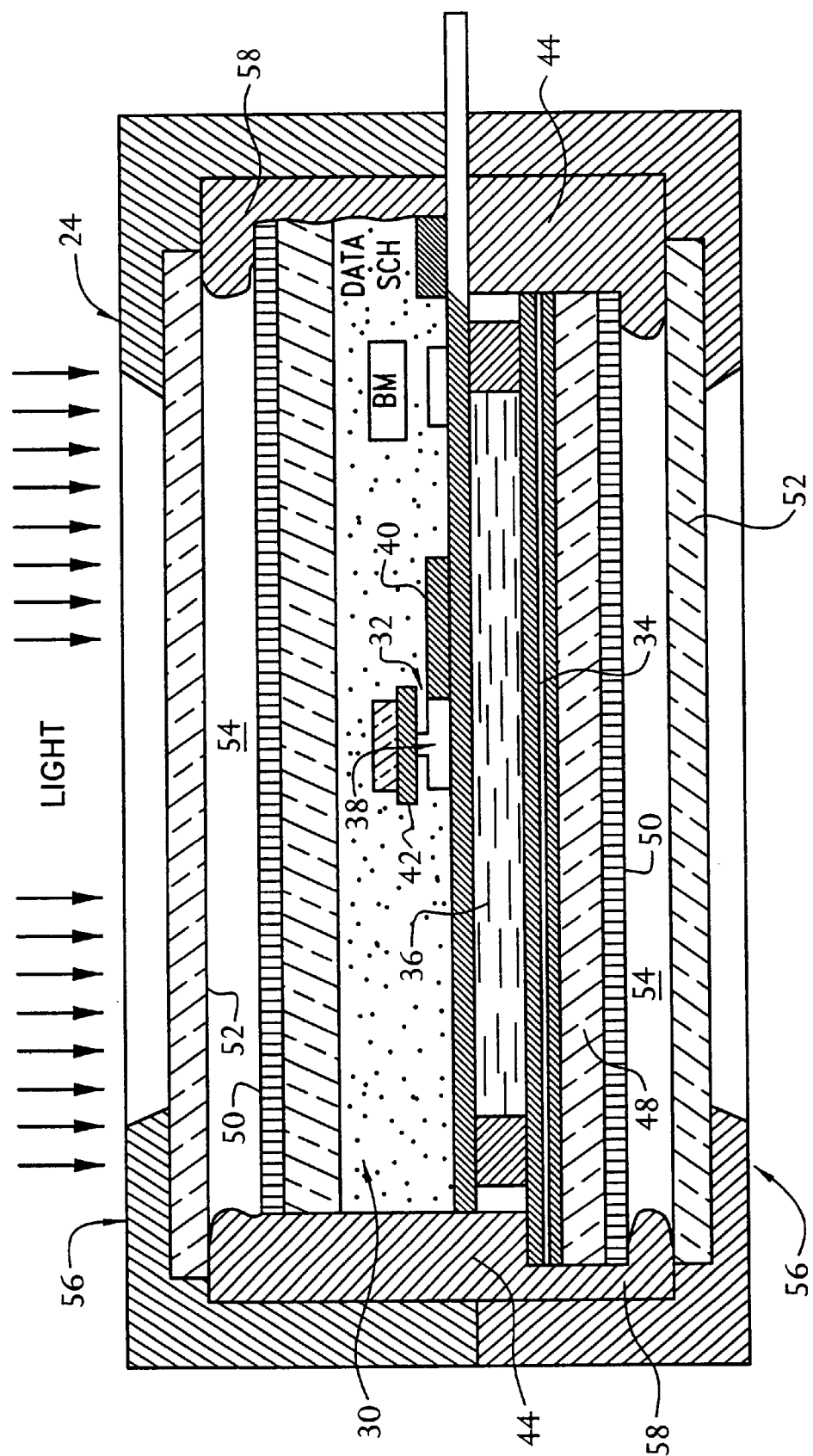
FIG. 3 is an enlarged sectional view of the display in its housing.

Referring to FIG. 3, a sectional view of a display 24 is shown. The display 24 has an active matrix portion 30 including a pixel element 32 spaced from a counterelectrode 34 by an interposed liquid crystal material 36. Each pixel element 28 has a transistor 38 and a pixel electrode 40. The active matrix portion 30 can have aluminum light shields 42 to protect the transistor (TFT) 38 if the active matrix is used for projection requiring high luminance light. The counterelectrode 34 is connected to the rest of the circuit by solder bumps 44. The matrix 30 is bounded by a pair of glass substrates 48 in this embodiment and a pair of polarizers 50. An additional pair of glass plates 52 are located outboard of the active matrix portion 30. The glass plates 52 are spaced from the polarizer 50. The space defines an insulation layer 54. The display 24 includes a two-piece case 56 which contains the active matrix portion 30, the glass plates 50 and the polarizers 52. A room temperature vulcanization (RTV) rubber 58 helps in maintaining the elements in the proper position in the case.

In order to get the liquid crystal to respond more quickly, the distance between the counterelectrode and the oxide layer is 2.0 μm at the pools. The narrow distance between the two elements results in less liquid crystal that has to twist to allow light to pass. However, the narrowing of the distance results in additional problems including the viscosity of some liquid crystals making it difficult to fill the display. Therefore, the selection of the proper liquid crystal requires an evaluation of the liquid crystal properties. The microdisplay is described in further detail in U.S. patent application Ser. No. 08/410,124 entitled, "Head-Mounted Display Apparatus With Color Sequential Illumination" filed Mar. 23, 1995 which issued on Sep. 30, 1997 as U.S. Pat. No. 5,673,059; U.S. patent application Ser. No. 09/153,744 entitled, "Portable Microdisplay System" filed Sep. 15, 1998; and U.S. patent application Ser. No. 08/966,985 entitled, "Color Sequential Reflective Microdisplay" filed Nov. 10, 1997, which are incorporated herein in their entirety by reference.

Figure 4:
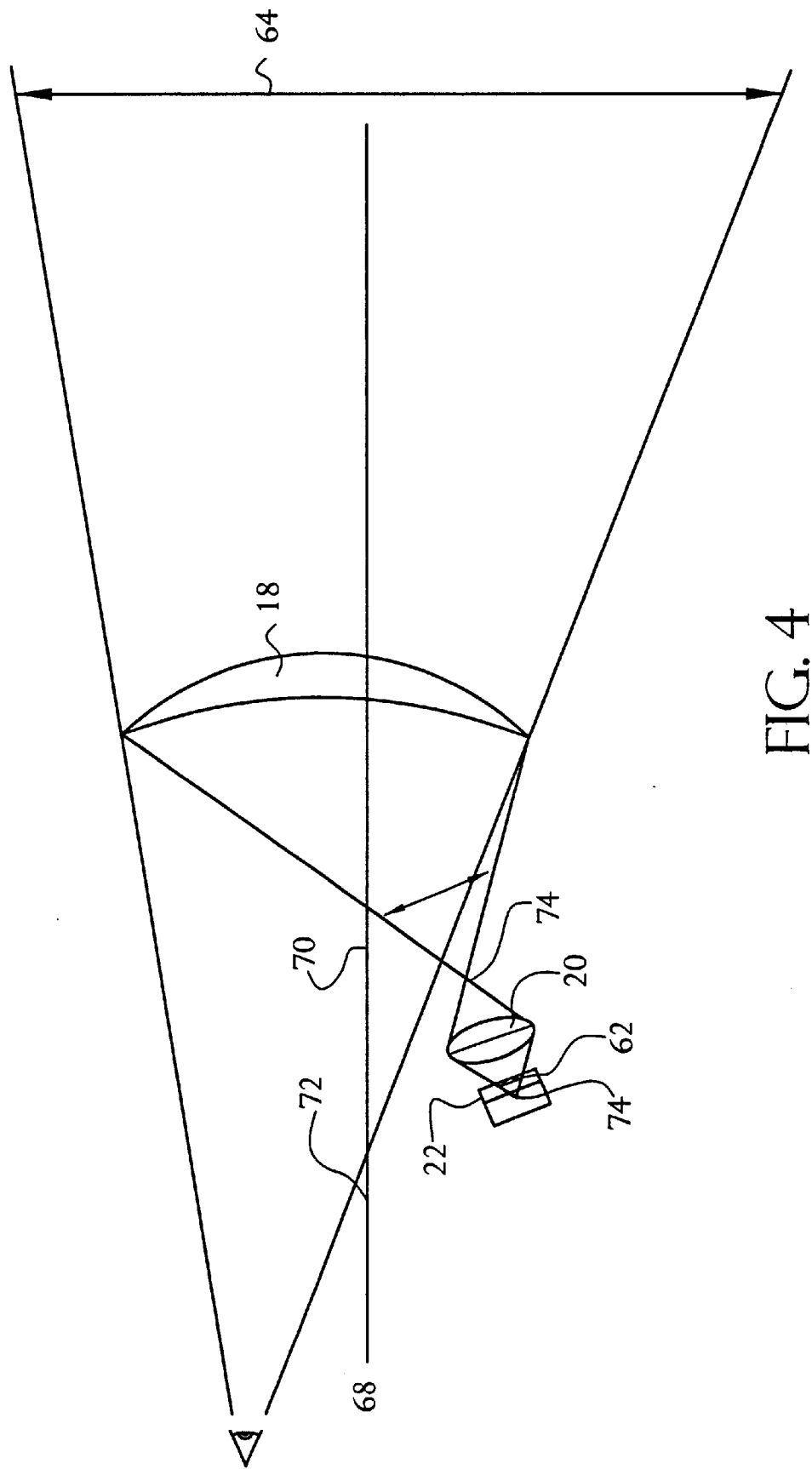
FIG. 4 is a ray diagram.

FIG. 4 shows an optical ray diagram. For ease of explanation, curved mirror 18 is either spherical or parabolic. An object 62 is in the plane of the liquid crystal 36 of the microdisplay 22 and virtual image 64 is the image of object 62 as reflected by concave mirror 18 and seen by the user.

The lens 20 is interposed between the display 22 and the curved mirror 18. The lens 20 inverts and magnifies the image, since the microdisplay 22 is outside the focal length 74 of the lens 20. The curved mirror 18 is outside of the focal length.

The mirror 18 has an optic axis 68. A focal point 70 on the optic axis 68 is the principal focus of mirror 18, e.g., for a spherical or the parabolic mirror point 70 is the focal point located at the focal distance. Point 72 on the optic axis 68 represents a point along the optic axis 68 at twice the distance from the mirror surface as is point 70.

Every concave spherical mirror has a focus and an optical axis. The focus is always located at some distance in front of the mirror and on its axis. Rays parallel and close to the optical axis directed at the surface of the concave mirror converge near or at its focus. Any object placed between the focus and the concave mirror will appear to be magnified when viewed by one standing somewhere behind the focus. The closer the object is located to the focus, the more it will be magnified. The object reflected by the concave mirror will also appear to the viewer as if it is located somewhere behind the surface of the mirror itself. This reflection is commonly called a virtual image.

Standard ray tracing techniques indicate that when object 62, as projected through the lens 20, is located further away from concave mirror 18 than the focal point 70 and closer to concave mirror 18 than point 72, then the resulting virtual image 64 will be a magnified image. Thus, in accordance with an aspect of the invention, object 62 is inverted with respect to the image that is desired to appear as virtual image 64.

With the microdisplay 22 below the optical axis 68 of concave mirror 18, the virtual image 64 is seen above the optical axis 68.

Although, as described above, concave mirror 18 has a focal surface that is a plane, because it is either a spherical or parabolic mirror, those skilled in the art will readily recognize that embodiments of the invention using concave mirrors other than spherical or parabolic mirrors may result in focal surfaces that are not planes, because of the configuration of the mirror. Use of such concave mirrors may be desirable.

In a preferred embodiment, the microdisplay 22 is a VGA having a 480×640 pixels and a diagonal length of approximately 0.38 inches. The lens 20 in a preferred embodiment is a lens system similar to that described below. The mirror 18 is 3 inches in length by 2 inches in height and has a radius of curvature of approximately 12 inches. The mirror has a focal point of 6 inches, on the optical axis and is spaced from the microdisplay by 6 inches. The lens system is interposed between the microdisplay and the mirror and is approximately 0.25 inches from the microdisplay. With this configuration, a person whose eye is 8 inches from the mirror would see a virtual image of 3×4 inches, which appears to be 20 inches from the person. In a preferred embodiment, the screen has for normal viewing an intensity of 20–60 foot-lamberts. The intensity is reduced for night viewing.

Figure 5:
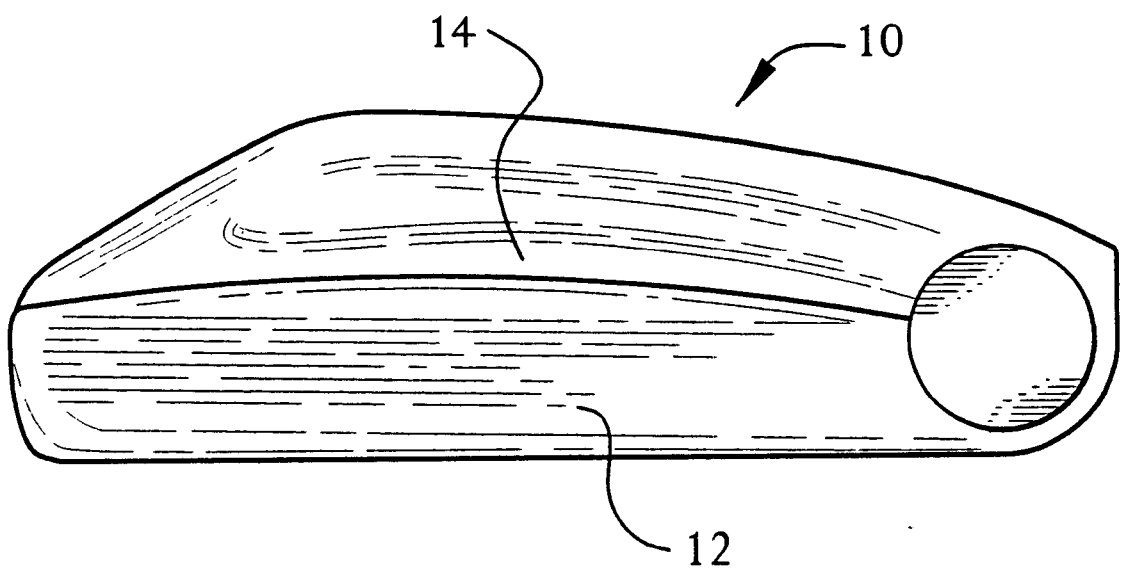
FIG. 5 is a side view of the hand-held viewer in a closed position.

FIG. 5 shows a side view of the hand-held viewer 10 in a closed position. The viewer in this closed position is of such a size that a user could place the viewer in a pocket. In a preferred embodiment, the viewer has a size of approximately three-and-a-half inches by three-and-a-half inches by an inch in thickness when in the closed position.

While in some embodiments a VGA color sequential microdisplay is preferred, in other embodiments a QVGA gray scale microdisplay is preferred. The QVGA has 240× 320 pixels and a diagonal length of approximately 0.24 inches. The backlight for a gray scale display is a single color LED, such as the NSPW500BS high power white LED marketed by NICHIA Chemical Industries.

Figure 6A:
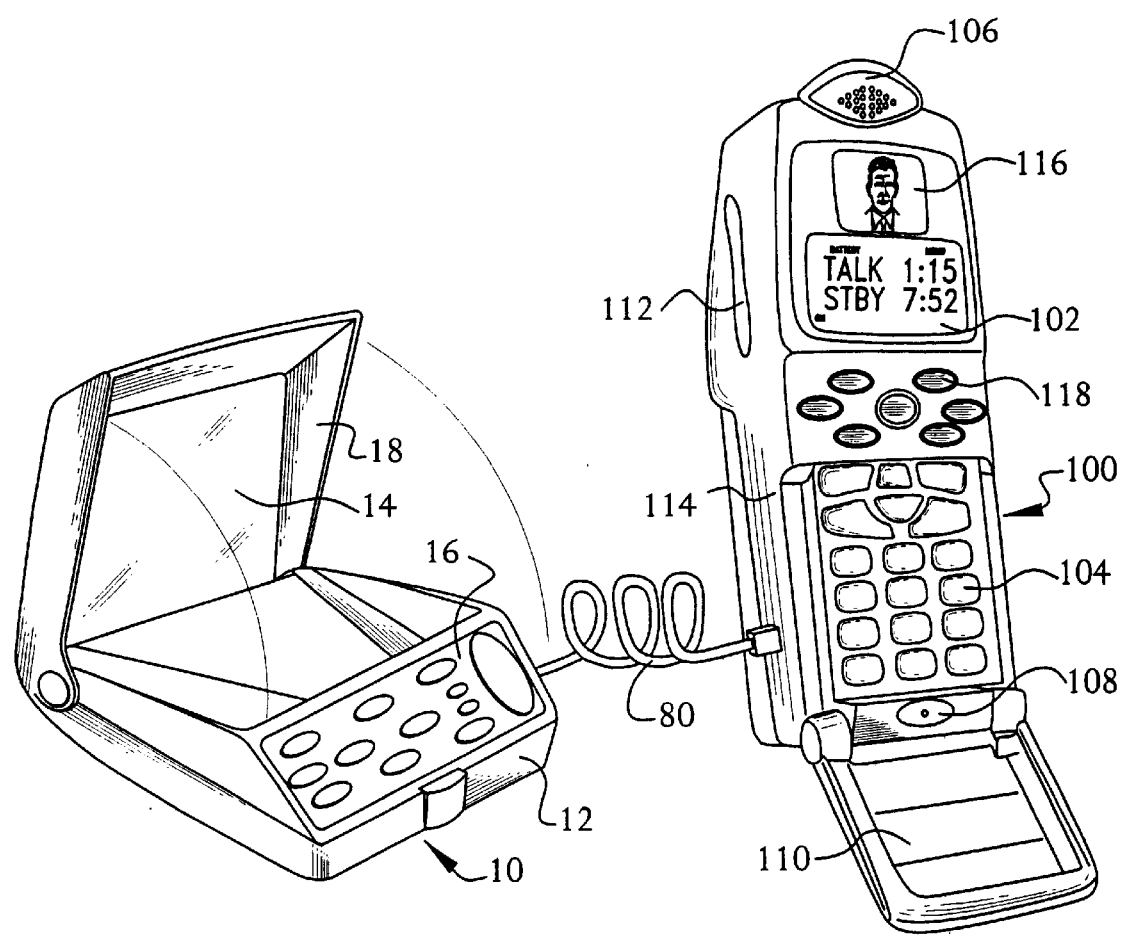
FIGS. 6A–6C illustrate a display telephone with the hand-held viewer of FIGS. 1–3.
Figure 6B:
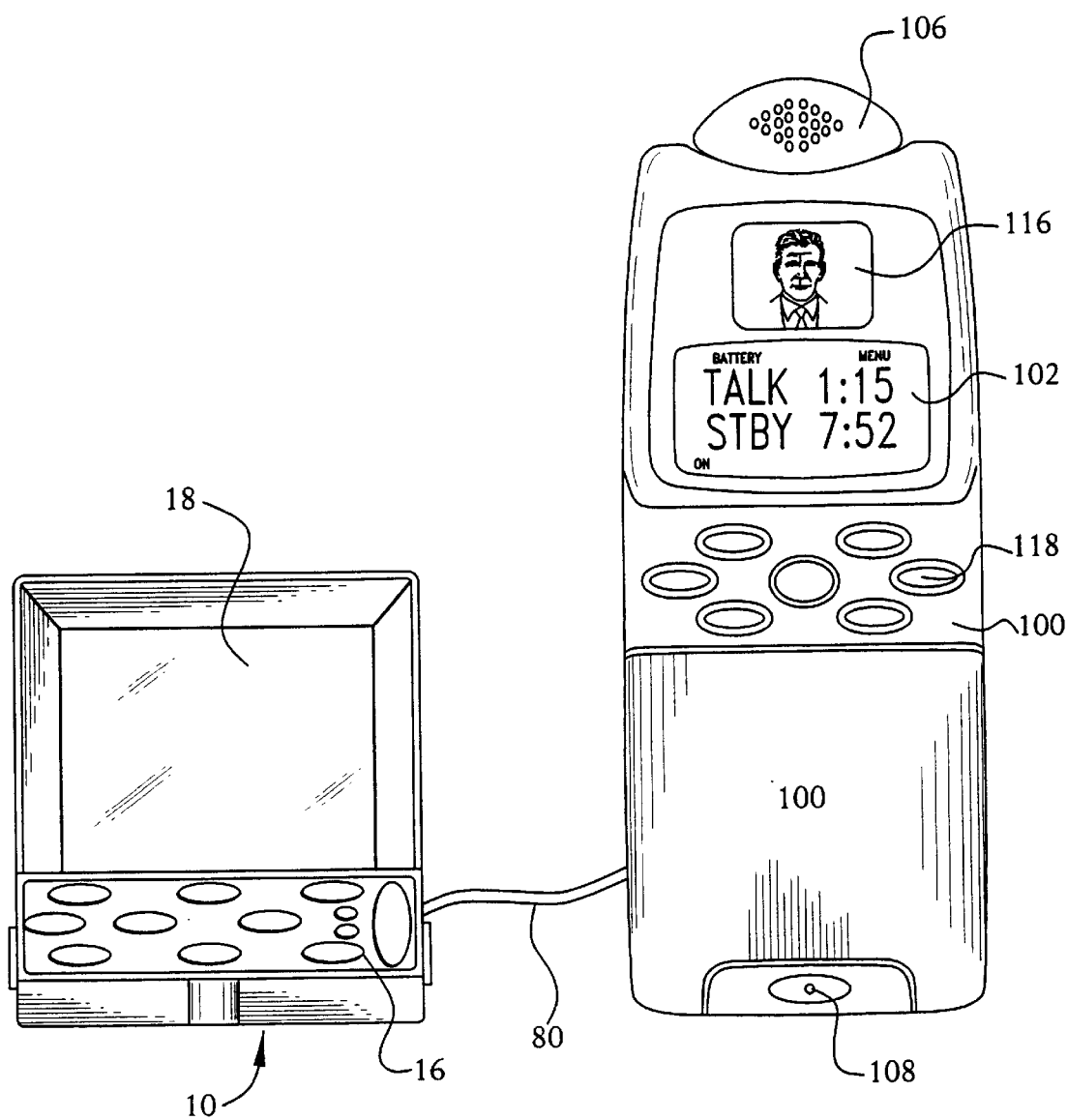
Figure 6C:
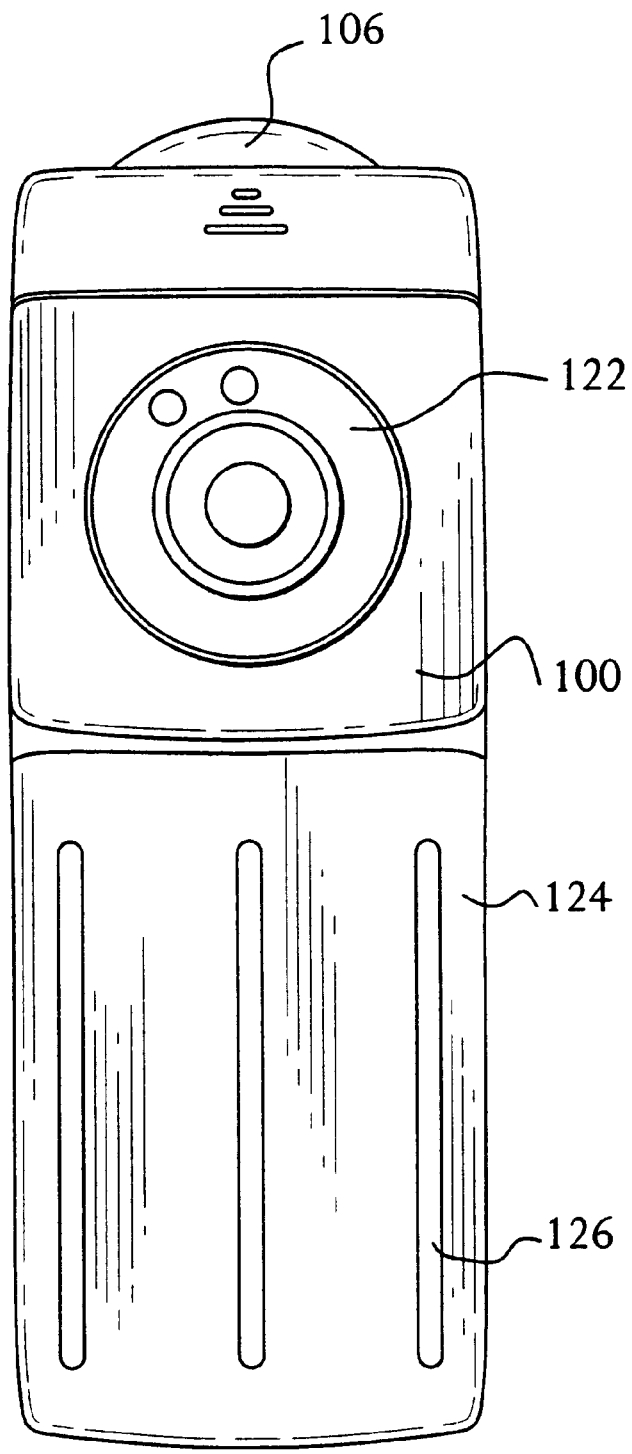

FIGS. 6A–6C show the hand-held viewer 10 connected to a cellular telephone 100. FIG. 6A is a prospective view of a cellular telephone 100 having an alphanumeric display 102, a keypad 104, a speaker 106, and a microphone 108. In addition, the cellular telephone 100 has a flip-lid 110 for covering the keypad 104 as found on many of conventional cellular telephones 100. In addition, the cellular telephone 100, in a preferred embodiment, has a scroll switch 112 on the left side of the housing 114. The scroll switch 112 can be used to select information on the alphanumeric screen 102 or on a microdisplay 116 located above the alphanumeric screen 102 in a preferred embodiment. Information on the microdisplay 116 can likewise be accessed using an additional keypad 118 or the conventional keypad 104 dependent on the workings of the particular cellular telephone 100.

FIG. 6B shows the front of the cellular telephone 100 with the flip lid 110 covering the keypad. In a preferred embodiment with the flip cover 110 in the closed position, the user can hold the cellular telephone 100 away from the user's face so that they can view the microdisplay 116. The phone is placed in a half-duplex mode such that the speaker 106 and the microphone 108 are not on at the same time, therein preventing feedback. The user is able to hear the speaker 106 from the distance that they are located in this mode and converse with the party on the other end of the cellular telephone call. The scroll switch 112 as seen in FIG. 6A and or the keypad 118 can be programmed to control and select images on either the alphanumeric display 102 or the microdisplay 116.

In an alternative embodiment, the earpiece 106 is detachable from the housing 114 of the cellular telephone 100 such that the user places the speaker 106 in or in proximity to the user's ear. The microphone 108 is capable of picking up conversation from the distance, approximately one foot, in that the cellular telephone 100 is spaced from the user.

Referring to FIGS. 6A and 6B, the hand-held viewer 10 is connected to the cellular telephone 100 by a wired link 80. The hand-held viewer 10 can display the same data as that seen in the microdisplay 116. The control panel 16 is capable of controlling the function of the microdisplay 116 of the cellular telephone 100 or microdisplay 22 of the viewer 10. A battery housing can be accessed through a panel on the bottom of viewer 10.

FIG. 6C shows the back of the cellular telephone 100. The speaker housing 106 is seen in the rear view. The cellular telephone 100 has a camera 122. The electronic images taken by the camera 122 can be transmitted by the cellular telephone 100. The microdisplay 116 as seen in FIGS. 6A and 6B is used for the camera element 122. The image to be recorded is selected using a "shutter" button. In addition, the cellular telephone 100 has a battery pack 124. In the preferred embodiment the battery pack 124 has a series of ribs 126 for easy handling.

Additional devices to which a hand-held viewer 10 can be connected are described above in the background of the invention and described in U.S. patent application Ser. No. 08/966,985 entitled, "Color Sequential Reflective Microdisplay" filed Nov. 10, 1997, and U.S. patent application Ser. No. 09/153,744 entitled, "Portable Microdisplay System" filed Sep. 15, 1998, which are incorporated herein in its entirety by reference.

Figure 7:
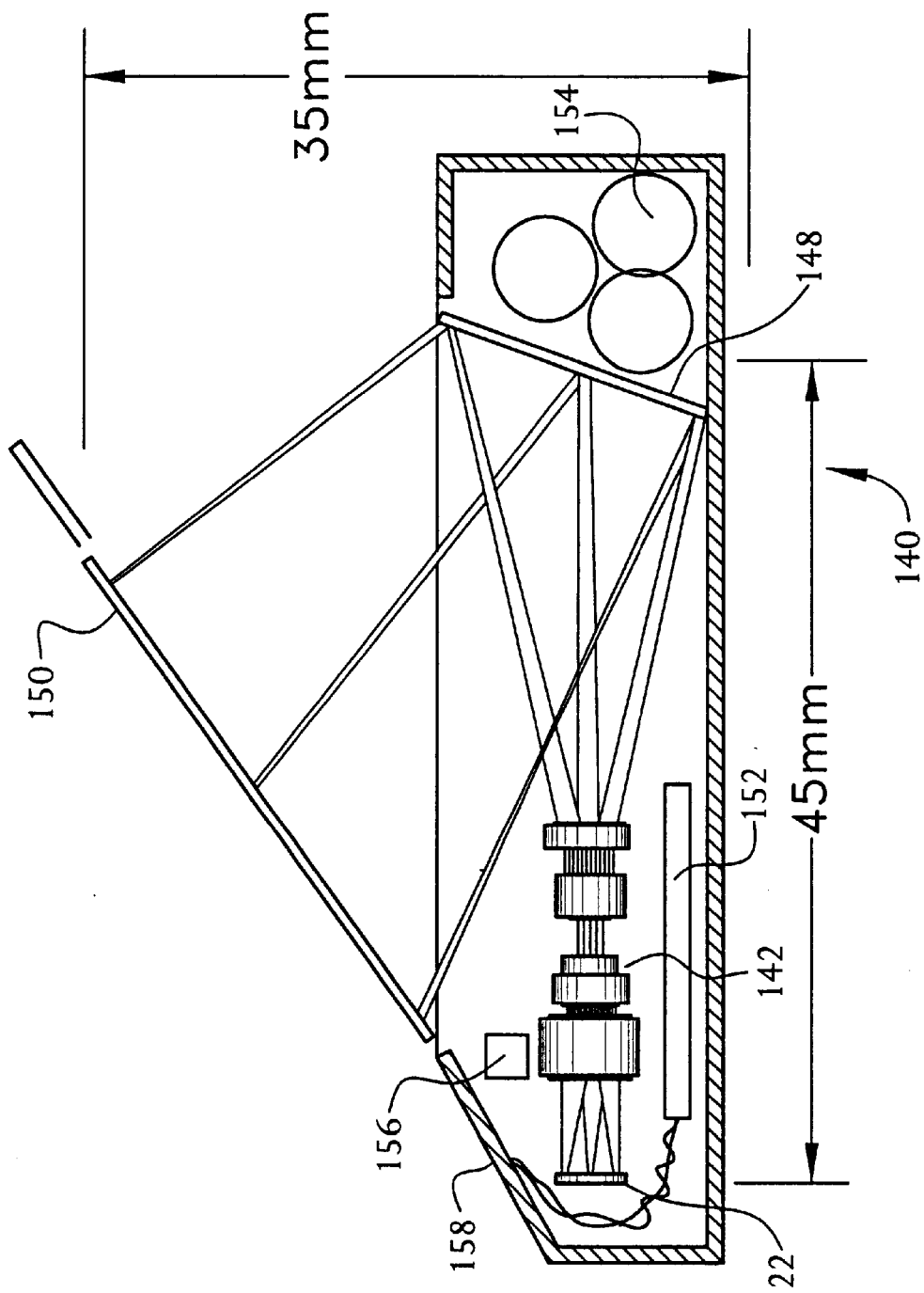
FIG. 7 is a side sectional view of an alternative viewer.

Referring to FIG. 7, an alternative embodiment of a viewer 140 is shown. The viewer 140 has a microdisplay 22, a lens system 142, a mirror 148, and a screen 150. Similar to the embodiments shown in FIG. 1, the viewer is flipped open. The screen 150 flips upward to space the screen 150 from the mirror 148. The viewer uses a plurality of lenses in the lens system 142 to gather the light projected through the microdisplay 22 and projected to the mirror 148. In addition, the mirror 148 is a flat surface in this embodiment, in contrast to the curved mirror of the previous embodiment.

The microdisplay 22 has a display 24 and a backlight 26. The viewer 140 has a circuit board 152 with the control circuitry for the microdisplay. The viewer 140 has a power source 154, such as three "AA" batteries. The image for the display is received by the viewer 140 by an input jack 156, which could be an RCA jack or other style input RGB component for inputting an RGB, composite, or other signal. A control panel 158 for the viewer 140 can have numerous controls or can be a simple on/off switch and possibly an intensity potentiometer for varying the backlight 26 intensity.

The lens system 142 is used to magnify the microdisplay 22, which can be an LCD display, and project the image on the screen 150 so that a person will be able to view a high quality image. The lens system 142 should be able to resolve the individual pixels on the microdisplay 22, over the entire display area, with very little distortion. Also the f-number of the lens system 142 should be small enough to collect the full cone angle of the light leaving the display 22.

At a microviewer viewing distance of about 15 inches, the eye can resolve features on the order of 150 micrometers. Therefore, the lens system 142 should magnify the pixels of the microdisplay 22 to at least 150 micrometers, to take full advantage of the displays capabilities. A magnification of at least 10 would be required for a display 22 with 15 micrometer pixels. At a magnification of 10, the distance between the lens system 142 and the viewing screen 150 would be about 10 times the focal length of the lens system 142. In order to make the viewer 10 as compact as possible, the focal length of the lens system 142 should be as short as possible. The limit to how short the focal length can be in practice is usually determined by the amount of acceptable distortion in the image.

A typical focal length for a lens system 142 that is able to meet acceptable imaging requirements is about 7 mm. This means the typical distance between the lens system 142 and the viewing screen 18 will be approximately 3 inches, and the screen 150 itself will be about 3 inches diagonal.

The distance between the lens system 142 and screen 150 can be larger than one would desire for mobile applications. Therefore, the microviewer 10 can be designed to have a collapsible screen 150 that can be extended away from the lens system 142 when in use, and retracted when not in use.

In a preferred embodiment, the mirror 148 is spaced from the microdisplay 22 by a distance of between 40 and 50 millimeters. The mirror 148 can be angled at approximately 68 degrees relative to the axis which extends through the microdisplay 22 and the center of the lens system. An image formed by the lens system 142 can be projected onto a screen 150. This screen 150 can be viewed directly, or an additional optical element (a concave mirror, a positive lens, or a Fresnel lens) can be placed between the screen 150 and a viewer in order to provide further image magnification. The purpose of the screen 150, in a preferred embodiment, is to deliver the maximum amount of light possible to the viewer's eyes, while allowing for some latitude in the positioning of the screen relative to the viewer's eyes.

Figure 8:
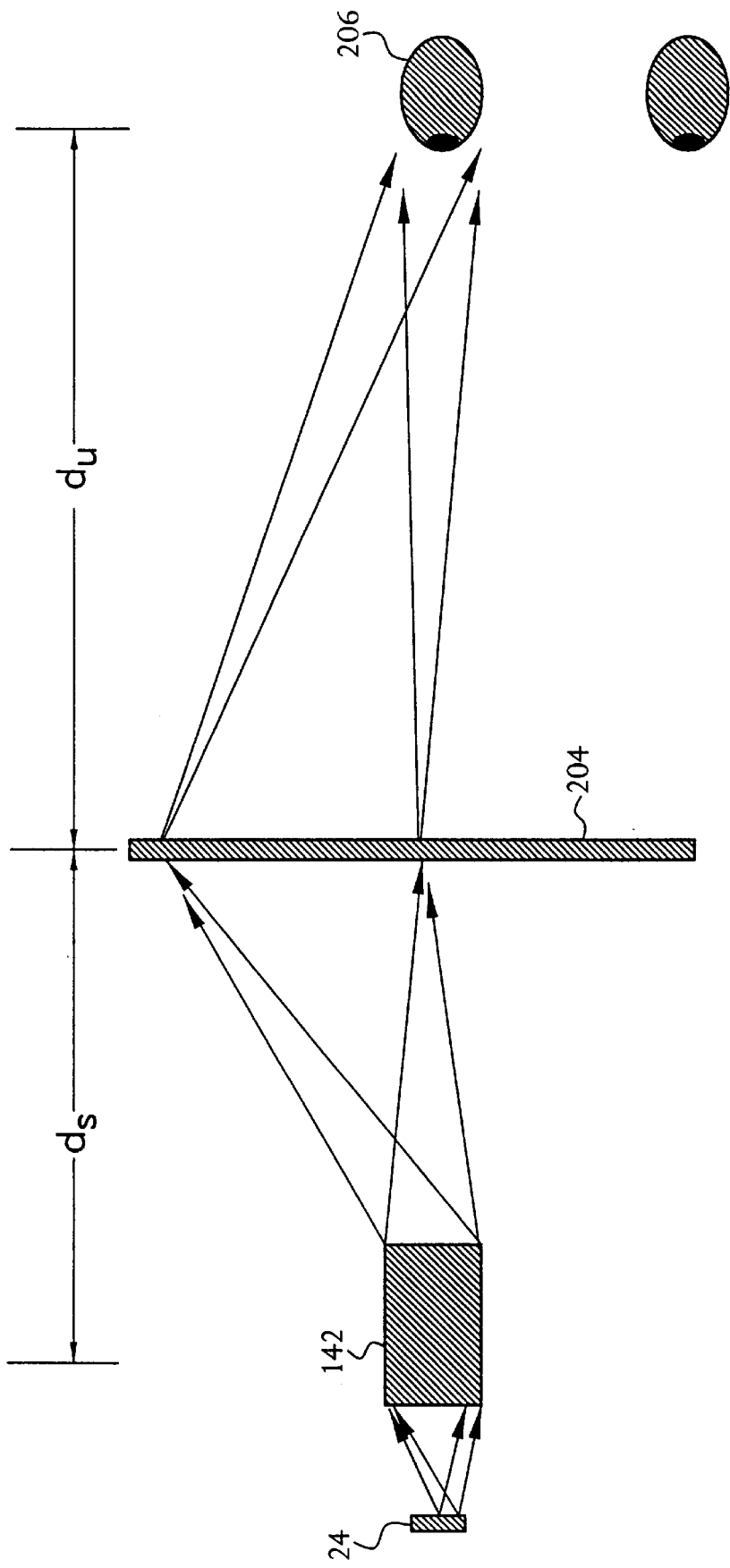
FIG. 8 illustrates a viewer with a Fresnel lens.

The screen 150 can perform two functions. The first function includes redirecting a cone of light from each image point to a specified direction. For optimum light utilization, the light from each image point on the screen should be directed toward one of the viewers' eyes, which can be accomplished, in a preferred embodiment, by using a Fresnel lens. A Fresnel lens 204, as illustrated in FIG. 8, can be located between a lens system 142, in proximity to the display 24, and a viewer 206. The Fresnel lens 204 located at an image plane will not introduce any magnification and will only redirect light rays toward the viewer. The Fresnel lens 204 does not have to reside exactly in the image plane, but should be as close to the image plane as possible.

The optimum focal length of the Fresnel lens 204, $F_s$, is given by the equation:

$$1/F_s = 1/d_s + 1/d_v$$

where $d_s$ is the distance between the projection lens and the image screen and $d_v$ is the distance between the image screen and the viewers' eye.

Placing the optimum Fresnel lens 204 at the image plane will maximize the amount of light that is incident on one of the viewers' eyes 206. However, there is very little latitude in the positioning of the device relative to the eye and precludes using the device as a binocular viewer. Therefore, the second function that the screen 150 can perform involves spreading light out in a controlled manner such that light from every image point is properly distributed within the desired "viewing window". The "viewing window" is the location in front of the device whereby a person can place their eye 206 and view the entire image. This light spreading can be accomplished by placing a diffuser 408 in the image plane. Unlike the Fresnel lens 204, the diffuser 208 must be placed in the image plane. If the diffuser 208 is not in the image plane, the image fidelity can be severely degraded.

Figure 9:
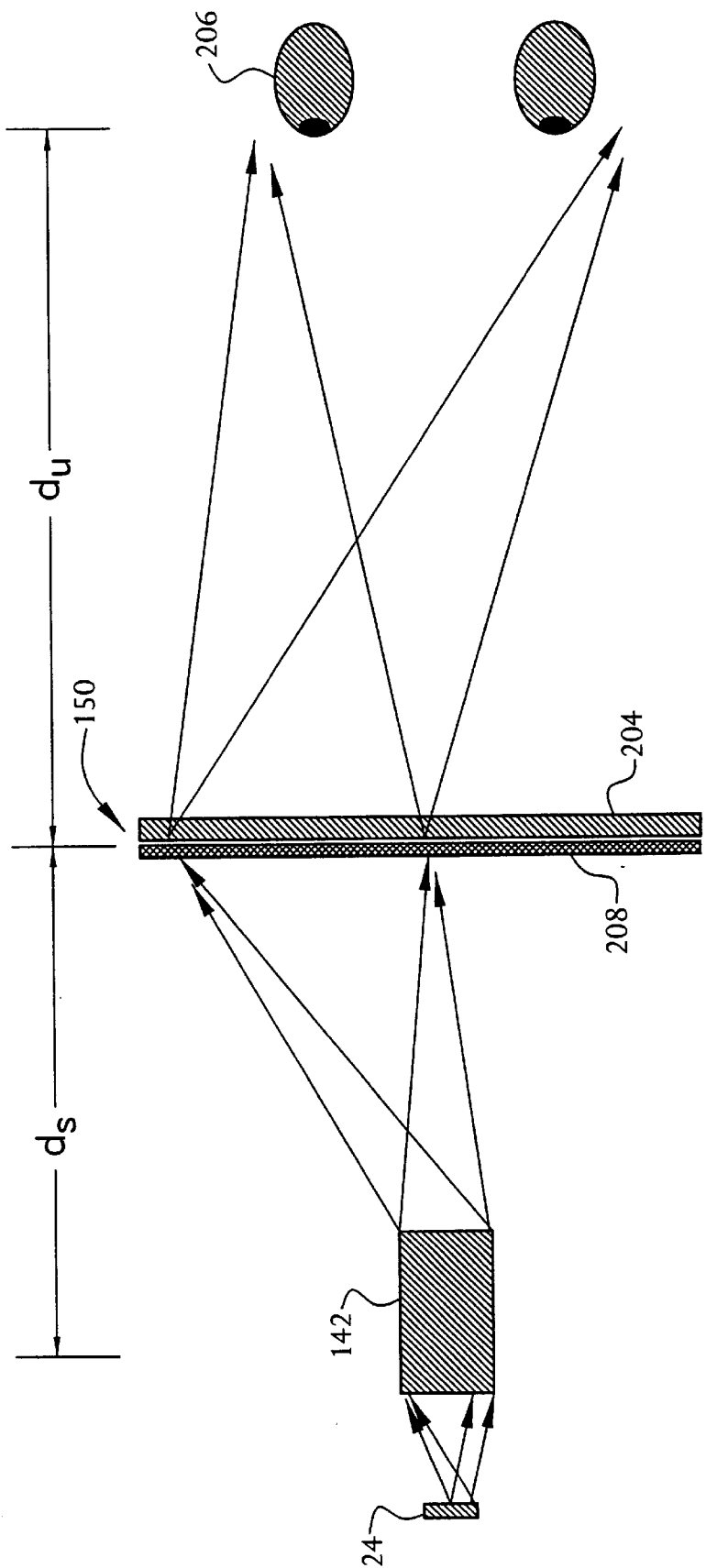
FIG. 9 illustrates a viewer with a Fresnel lens and a diffuser.

The screen 150, in a preferred embodiment, is a combination of a Fresnel lens 204 and a diffuser 208, shown in FIG. 9. The Fresnel lens 204, in a preferred embodiment, has a focal length equal to the linear distance from the Fresnel lens 204 to the lens system 142 via a mirror. There are 100 grooves per inch and the Fresnel lens 204 has a thickness of 0.06 inches. The optimum diffuser 208 will uniformly spread the light from each image point into a specified angular range. For example, if one desires binocular viewing, the "viewing window" dimensions should be about 6×1.5 inches. At a comfortable viewing distance of approximately 14 inches, the required angular spread of the light from each image point should be 30 by 5 degrees. The diffuser 208, such as sold by Physical Optics Corporation, has an elliptical field of view of 5 degrees vertical and 30 degrees horizontal. The diffuser 208 is positioned adjacent the Fresnel lens 204 and interposed between the Fresnel lens 204 and the mirror. It is recognized that the screen could have diffractive, or holographic elements in place of the Fresnel lens 204 and diffuser 208 combination to diffuse the light. It is also possible to diffuse the light from each image point so that the light is divided into two cones of light, each cone directed at different eyes. In a preferred embodiment, the lens system 142 has a focal length of 6.0 and F-stop of 1.8 and an angular field of view of greater than 67 degrees. The first element of lens system 142 is positioned approximately 0.25 inches from the microdisplay.

The screen 150, composed of the Fresnel lens 204 component and the diffuser 208 component, can be constructed in various ways. The two components 204, 208 can be separate elements, can be on different sides of the same substrate, or can be on the same side of a single substrate. In a preferred embodiment, the screen 150 can be a single substrate, made of plastic, and easily manufactured by a process such as injection molding, for example.

One of the benefits of the microdisplay viewer is the minimal power requirements. The units are capable of being driven by three "AA" batteries. The QVGA gray scale microdisplay with the single LED and circuitry associated with the display draws approximately 100 mil watts or less. The circuitry for the microdisplay is further described in U.S. patent application Ser. No. 08/966,985 entitled, "Color Sequential Reflective Microdisplay" filed Nov. 10, 1997, and U.S. patent application Ser. No. 09/153,744 entitled, "Portable Microdisplay System" filed Sep. 15, 1998, which are incorporated herein in its entirety by reference.

Figure 10:
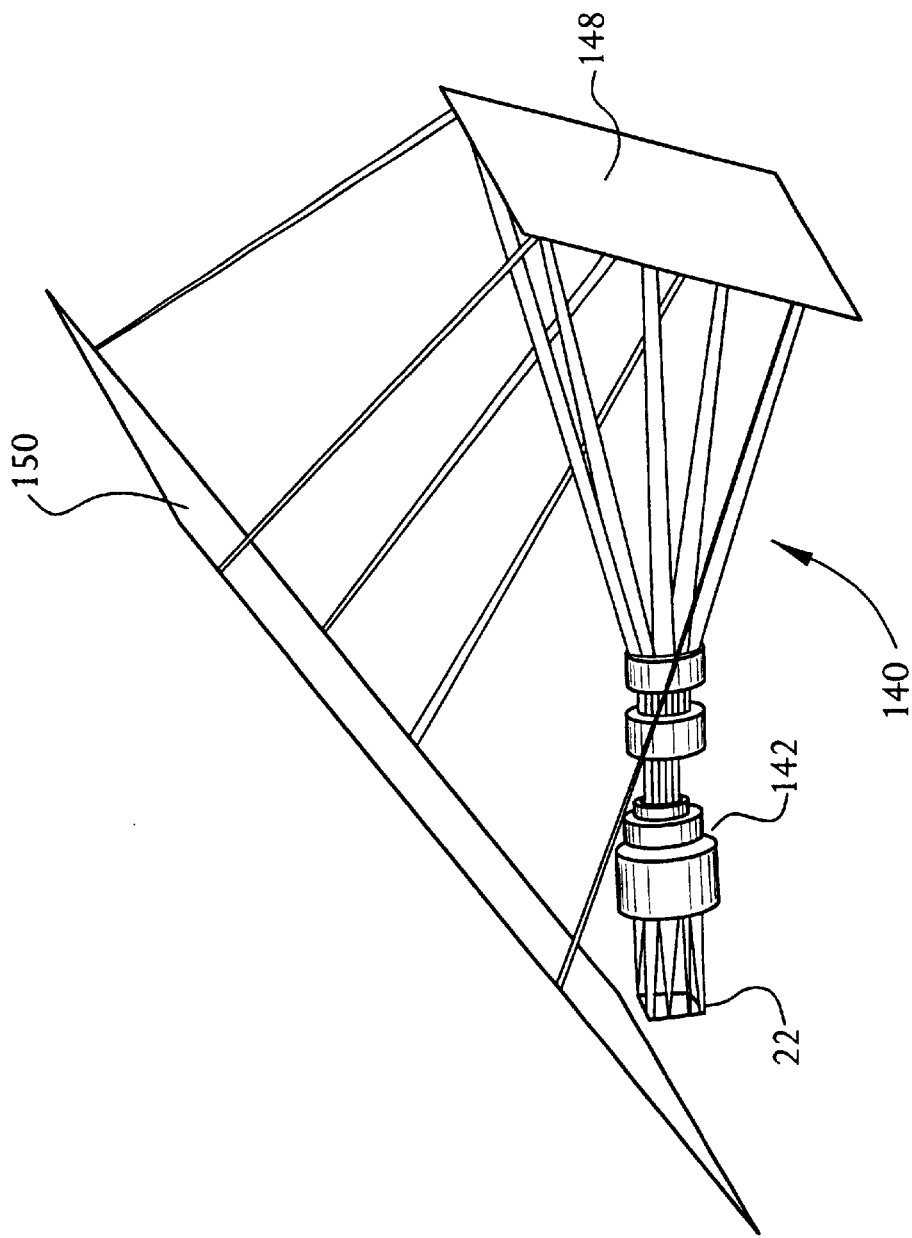
FIG. 10 is a perspective view of the viewer.

Referring to FIG. 10, a perspective view of the microviewer 140 of FIG. 7 is shown. This microviewer can have a microdisplay 22, lens system 142, mirror 148, and viewing screen 150. The ray diagram shows the image being projected from the microdisplay 22 to the viewing screen 150. In this embodiment, the image projected is not inversed from that of the microdisplay, so that the image viewed on the viewing screen 150 is identical to that viewed on the microdisplay.

Figure 11A:
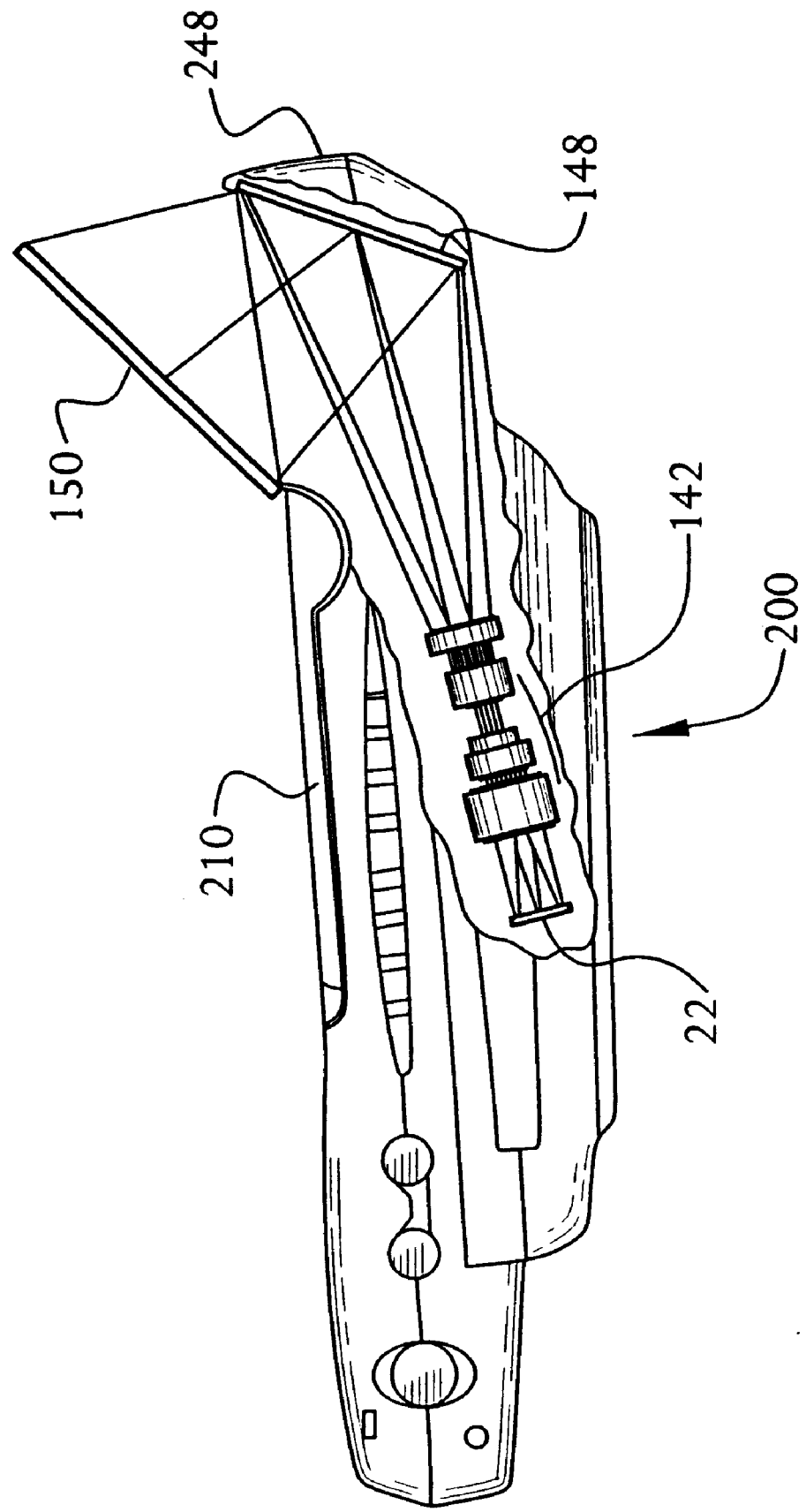
FIG. 11A is a side view of a wireless telephone with portions broken away to show the viewer in a open position.

In addition to having a separate unit which may be plugged into various units as described above, the viewer may be incorporated into a device such as a cellular telephone 200 shown in FIG. 11A. A portion of the cellular telephone 200 is broken away to show the microdisplay 22, lens system 142, flat mirror 148, and viewing screen 150. The cellular telephone 200 has a flip cover 210 to access a key pad. The screen 150 flips outwards away from the mirror 148. The user is capable of viewing the image projected on the screen from a distance such as a forearm length from the eye. While the embodiment shows the screen flipping upward, it may be desired to have the mirror and a portion of the housing rotate downward away from the screen.

Figure 11B:
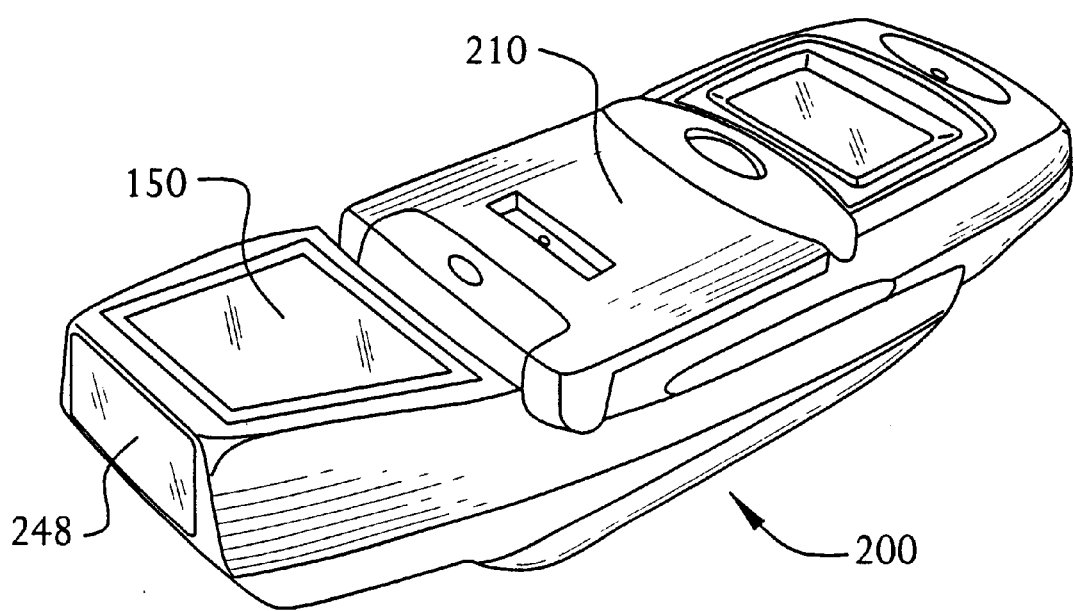
FIG. 11B is a perspective view of the wireless telephone with viewer.

In some embodiments, most like those embodiments with virtual images, it may be contemplated to flip the mirror and allow direct viewing of microdisplay with lens for magnification. FIG. 11B shows a direct view screen 248.

Figure 12:
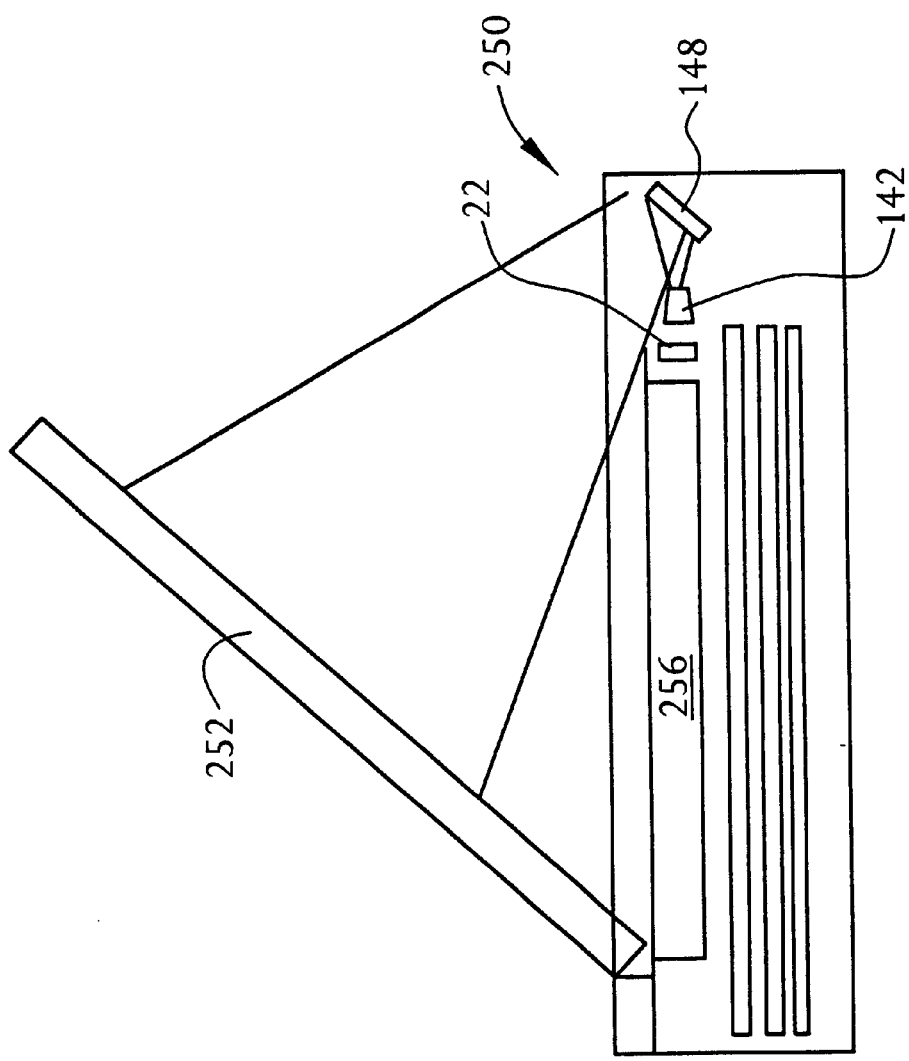
FIG. 12 is a side view of the DVD player with a flip-up viewer.

It is recognized that the viewer can be used on other wireless devices such as pagers or other devices such as digital cameras, card readers, and DVD players. A DVD player 250 is illustrated in FIG. 12 with a flip screen 252 and a microdisplay 22. The side view shows that the microdisplay 22 is located adjacent a DVD disk receptacle 256. The image is projected to a mirror 148 where the image is redirected to the screen 252 which is located above the DVD disk when open. A lens system 142 is interposed between the microdisplay 22 and the mirror 148. The microdisplay 22 and the mirror 148 are located along a center axis which runs from front (the left side in FIG. 10) to rear (the rear side in FIG. 10). It is recognized that the microdisplay 22 can be located in a corner of the DVD player. The lens and the screen would need to correct for the asymmetric projection.

Figure 13:
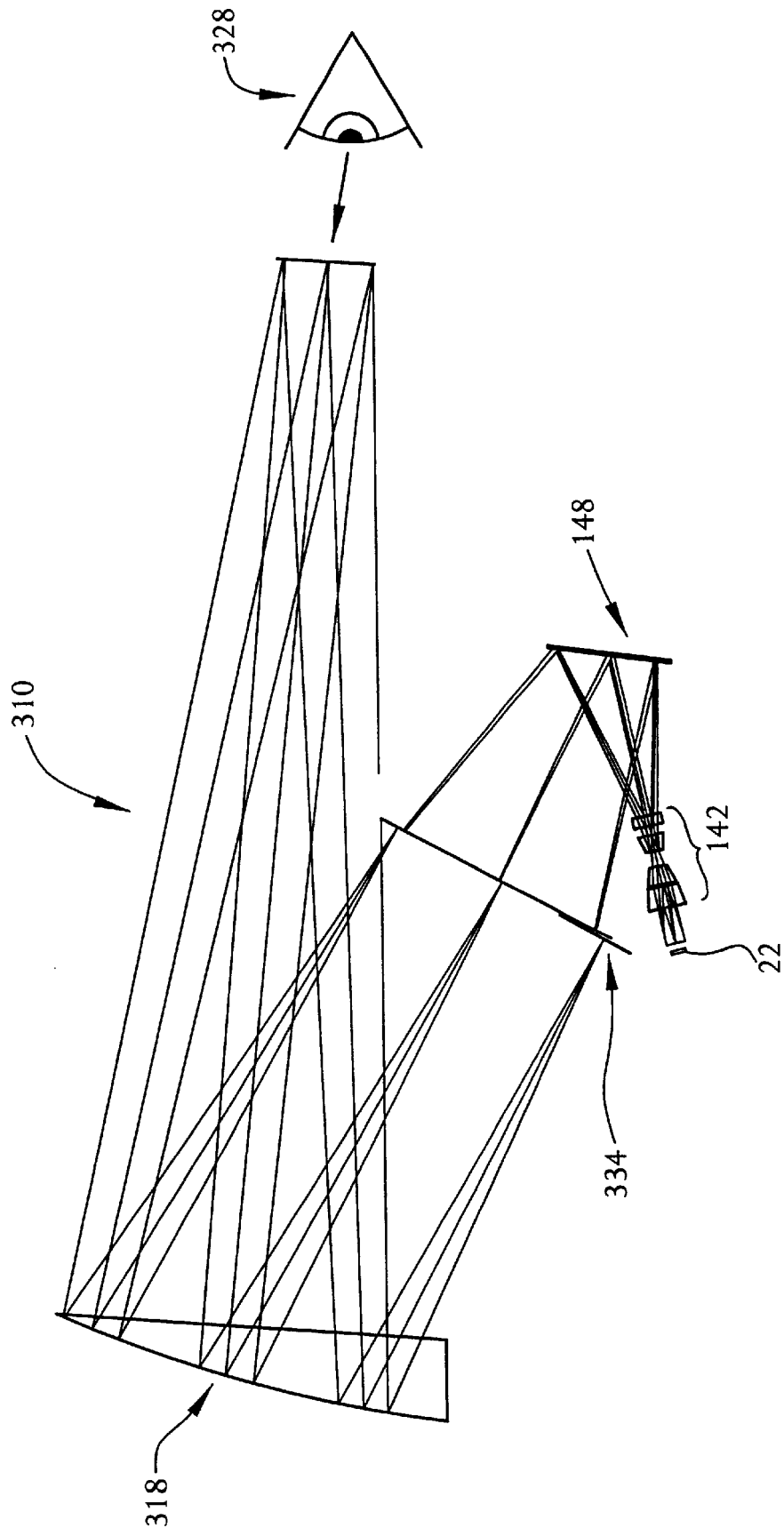
FIG. 13 is a side sectional view of an alternative viewer.

FIG. 13 shows a side view of the components of an alternative viewer 310 in an open position. The curved mirror 318 has an image projected on it through a lens system 142 by a microdisplay 22. The microdisplay 22 has a display 24 and a backlight 26. In contrast with the previous embodiment, the viewer 310 has in addition a planar mirror (a fold mirror) 148 interposed on the image path between the lens system 142 and the curved mirror 318. In addition, a screen 334 having a Fresnel lens and a diffuser, such as discussed above with respect to FIG. 9 is interposed between the lens system 144 and the mirror 318. The screen scatters the pixels into a cone. The virtual image viewed is of the screen 334 not the microdisplay.

The microdisplay 22, the image source, is directed at the curved mirror 318, by the lens system 142, planner mirror 148 and the screen 334. In a preferred embodiment, the curved mirror 318 is a concave spherical mirror segment of a larger hemispherical mirror structure. The mirror 318 is held stationary at some predetermined distance above and in front of microdisplay 22. When the mirror 318 is fully aluminized, preferably the rear surface, it magnifies the image received from the lens and reflects it toward a user's eye 328 located at some distance from the viewer. The user's eye 328 is represented by the schematic eye 328.

In a preferred embodiment, a light source is required for the microviewer 10. The light source should be efficient converting electrical power into light, and should also have a high radiance. In a preferred embodiment, a high radiance source is required because of the small active area of the LCD display and the fact that a projection lens is being used to enlarge the image.

The sources that best meet the above requirements are high brightness LED's. High brightness LED's are currently manufactured by various companies (Hewlett-Packard, Nichia, Panasonic, et. al.) and are available in red, green, blue, and white light. The light from these LEDs are emitted from a 5 mm diameter (area=20 mm$^2$) circular aperture with an angular divergence of approximately 15 degrees. A 320×240 LCD display with 15 micrometer pixels has an active area of about 11 mm$^2$. Conservation of brightness requires that if the light from the LED is compressed into the active area of the LCD display (a factor of 2), then the angular divergence of the light leaving the display will increase by a factor of 2. Thus, in order to place all of the light from the LED into the LCD display, the angular divergence of the light leaving the display will double to about 30 degrees. The projection lens has to be able to collect this 30 degree cone angle of light, which requires that the projection lens have an f-number of 1.8 or less. If the f-number of the projection lens is greater than 1.8, then some of the light from the LED source will be wasted. If the pixels in the display are larger, then the projection lens will collect all of the light at a larger f-number.

Figure 14:
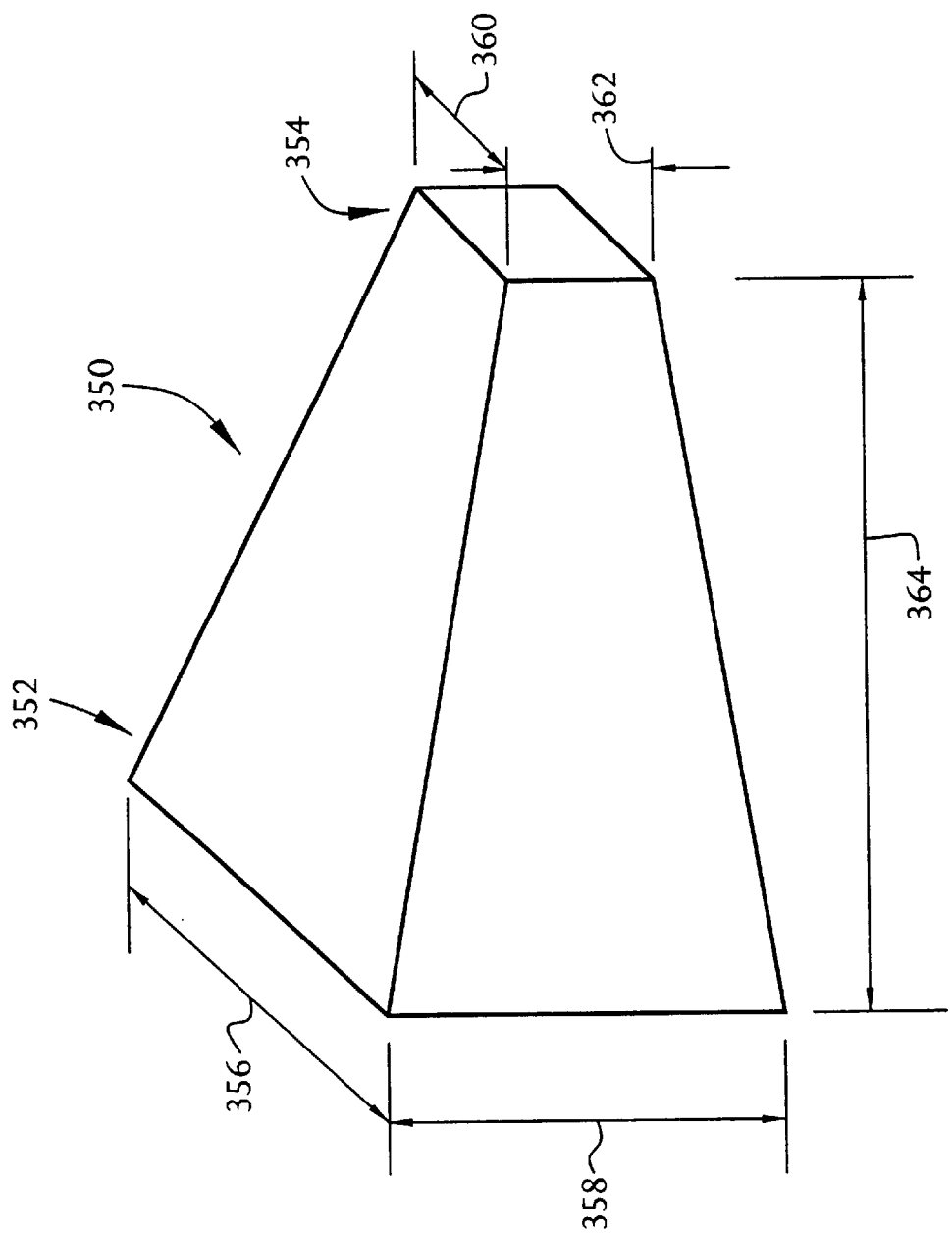
FIG. 14 shows a light pipe.

In another preferred embodiment of the light source, the illumination at the plane of the LCD display should be as uniform as possible. The two functions of compressing the light from the LED to fill the LCD display area, and having the illumination be uniform, is best accomplished with a light pipe 350, illustrated in FIG. 14. The light pipe 350 can be made hollow with reflecting internal surfaces or out of a solid transparent material such as glass or plastic. In a preferred embodiment, the light pipe 350 is made from clear plastic. The light pipe 350 can have a first, or input end 352 and a second or output end 354. The second end 354 of the light pipe 350 can have rectangular dimensions 362, 364 the same as those of an LCD display active area. This end 352 of the light pipe 350 can abut the LCD surface. The first end 352 of the light pipe 350 can have rectangular dimensions 356, 358 that are just large enough to capture all of the light emitted from the LED (or LED's). The light pipe 350 can have a trapezoidal shape, with the length 364 of the light pipe 350 chosen so that the illumination at the LCD side of the light pipe has the desired uniformity. The longer the light pipe 350, the more uniform the illumination will be. In a preferred embodiment, the length 364 is about 1.5 inches.

In another embodiment, the light source is to be compact. The preferred length of the light pipe may not be compact enough for mobile applications. Compromises can be made between the length of the light pipe and the resulting image uniformity. Also, a lens array structure and diffuser can be used instead of a light pipe to achieve image uniformity at the expense of decreased image brightness.

A cone of light leaves each point on the output facet of the light pipe with the axis of the cone of light perpendicular to the output facet. Most lenses suitable for use as a projection lenses are designed such that the optimum axis for the cone of light entering the lens is a function of the location on the LCD display. Therefore, using one of these lenses with a light pipe illuminator will result in vignetting of the image, the reduction of light intensity near the edges, and an under utilization of the incident light. This situation can be corrected by sandwiching a single element lens of the proper focal length between the LCD display and the output facet of the light pipe. This "condenser" lens 374 should have a focal length that is equal to the distance between the LCD display and the projection lenses pupil location.

Figure 15:
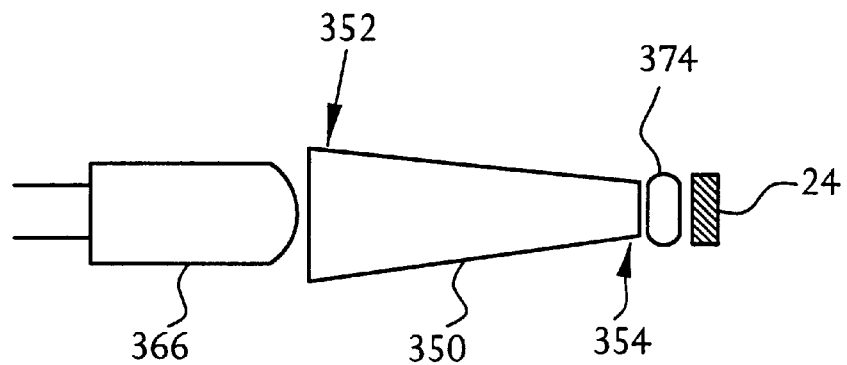
FIG. 15 illustrates a white LED light source for a microviewer.

If the microviewer 10 is monochrome, there are two possible configurations of LEDs that can be used as the source. The simplest configuration is just a single white LED 366, shown in FIG. 15. The output facet of the white LED is abutted to the input end 352 of the light pipe 350. The input end 352 of the light pipe 350 in this embodiment should be about 6×6 mm. The output end 354 of the light pipe 350 can abut a condenser lens 374.

Figure 16:
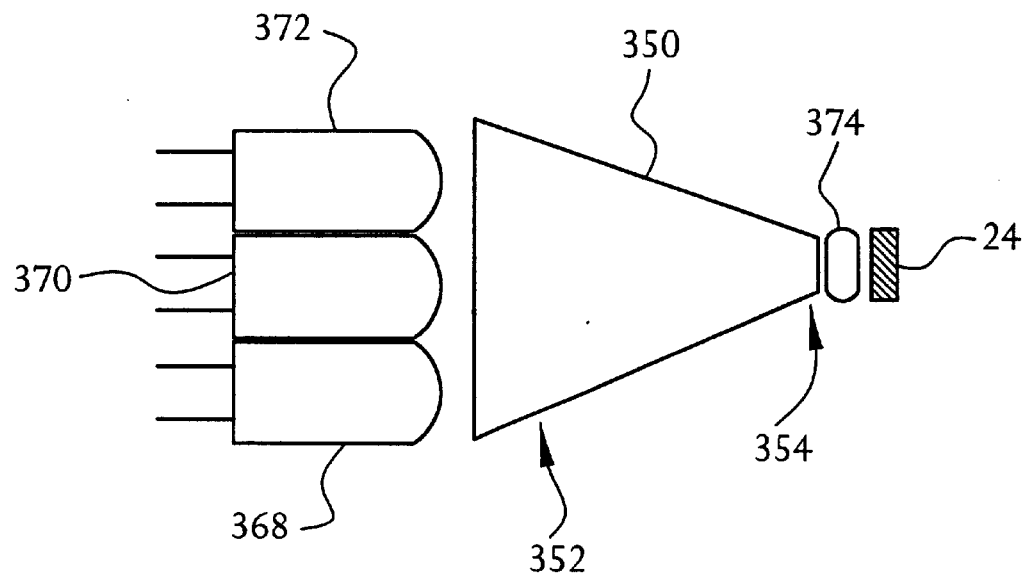
FIG. 16 illustrates an embodiment of a color LED light source for a microviewer.
Figure 17:
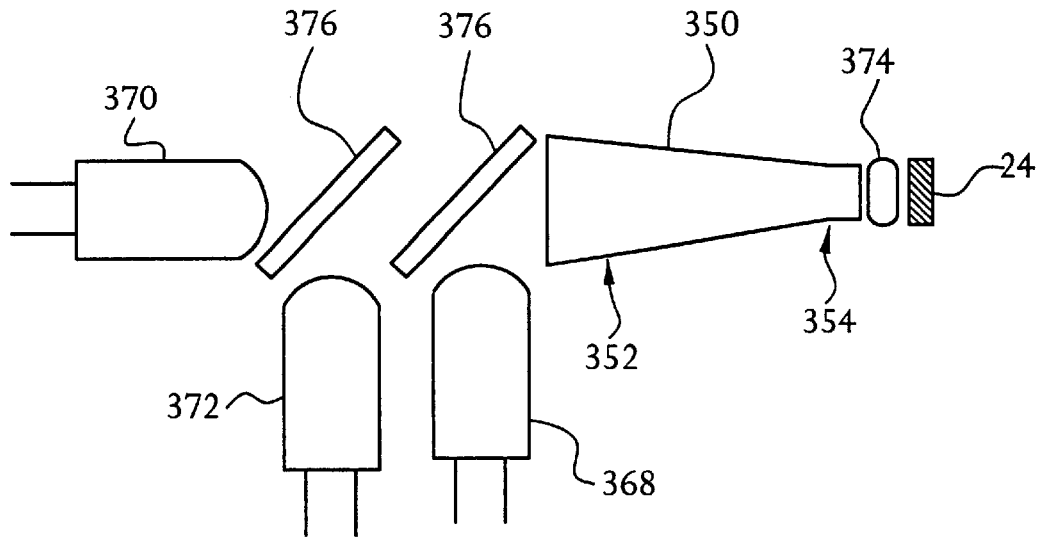
FIG. 17 shows an alternate embodiment of a three LED light source.

The second configuration is to use three LEDs as the light source, one red 368, one green 370, and one blue 372, shown in FIG. 16. If all three (3) LEDs are flash simultaneously a white light is produced. The three LEDs can be placed side by side or close packed with the input side 352 of the light pipe 350, configured to accept the light from all three of the LEDs. Another possibility is to first combine the light from the different color LEDs with two dichroic filters, as shown in FIG. 17, so that all three colors are overlapped and traveling in the same direction. The combined light would then enter the light pipe 350. One benefit of using three different color LEDs to produce a white light, is that with two dichroic filters the light of the three color LEDs can be aligned to produce a brighter light.

Figure 18:
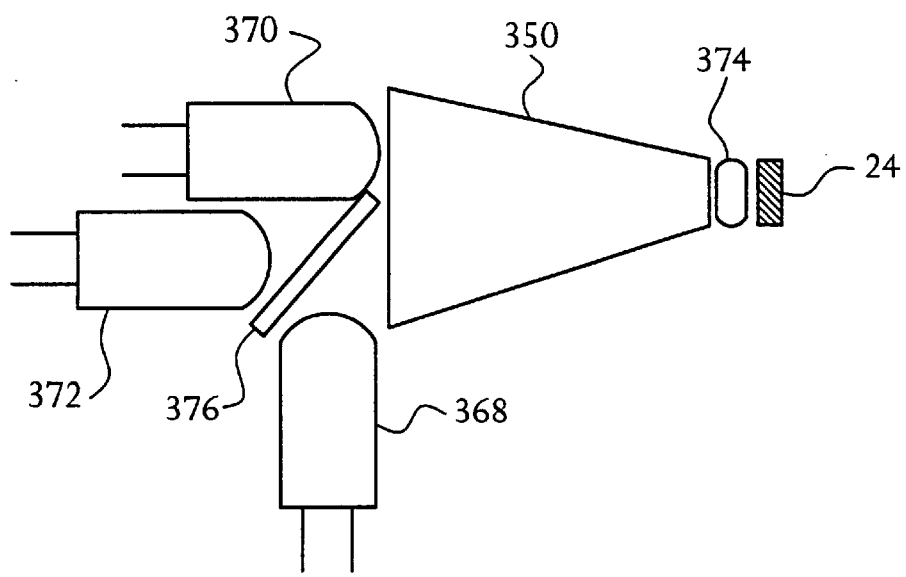
FIG. 18 shows an alternate embodiment of a three LED light source.

The side by side or close packed configurations have the advantages of being simple and inexpensive, but suffer from the fact that the angular divergence of the light leaving the LCD display is increased, so that the projection lens may not accept all of the light. A dichroic filter approach, shown in FIG. 17 does not suffer from the increased angular acceptance problem, but its efficiency relies on the transmission characteristics of dichroic filters 374. A combination of the above two approaches can also be used in an alternate embodiment, as shown in FIG. 18, where two of the colors 370, 372 are first combined with a dichroic filter 374, and then the output from the two combined colors is placed side by side with the third color LED 368. This approach has advantages and disadvantages that are compromises between the first two approaches.

All of the above embodiments that employ three separate LEDs have the advantage that they can also be used with time-sequential color LCD displays to produce color images. The different LEDs are simply addressed with pulsed sources such that the different colors are turned on and off in synchronization with the LCD display. Color sequential is further described in U.S. patent application Ser. No. 08/938,693 titled "Color Sequential Display Panels filed Sep. 26, 1997, U.S. patent application Ser. No. 08/966,985 title "Color Sequential Reflective Micro Display" filed Nov. 10, 1997, and U.S. patent application Ser. No. 09/309,155 titled "Portable Microdisplay System" filed May 10, 1999, all of which are incorporated herein by reference.

Figure 19:
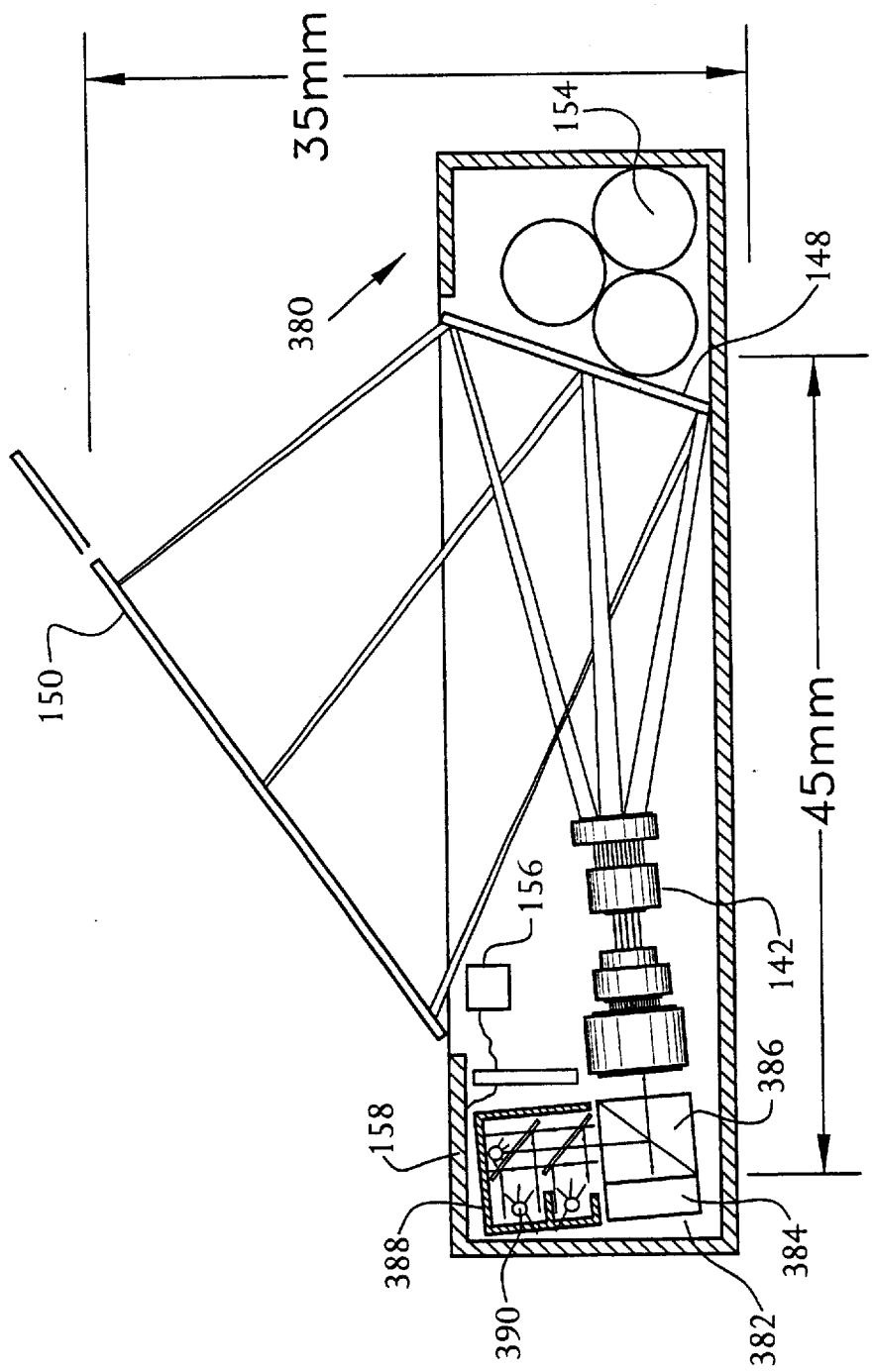
FIG. 19 shows a side sectional view of an alternative viewer with a reflective display.

Referring to FIG. 19, an alternative embodiment of a viewer 380 is shown. The viewer 140 is similar to the viewer 140 of FIG. 7. and has a lens system 142, a mirror 148, and a screen 150. The screen 150 flips upward to space the screen 150 from the mirror 148. In contrast to the viewer 140 of FIG. 7, the viewer 380 has a reflective microdisplay 382 as explained below. The viewer uses a plurality of lenses in the lens system 142 to gather the light reflected by the microdisplay 382, as explained below, and projected to the mirror 148.

The viewer 140 has a circuit board 152 with the control circuitry for the microdisplay. The viewer 140 has a power source 154, such as three "AA" batteries. The image for the display is received by the viewer 140 by an input jack 156, which could be an RCA jack or other style input RGB component for inputting an RGB, composite, or other signal. A control panel 158 for the viewer 140 can have numerous controls or can be a simple on/off switch and possibly an intensity potentiometer for varying the backlight 26 intensity.

The reflective microdisplay 382 has an active matrix liquid crystal display 384 and a dichroic prism 386. The dichroic prism 386 is interposed between the active matrix liquid crystal display 384 of the microdisplay 382 and the lens system 142. A light source housing 388 is contained within the viewer 380. The light source housing 388 has a plurality of light emitting diodes (LEDs) 390. The LEDs 390 are located in cells. A pair of dichroic mirrors 392 and 394 are located in the lighting housing 388 to direct the desired light from each color light source along a common axis towards the prism 386.

The light from the LEDs 390 is directed by the prism 386 towards the liquid crystal of the active matrix 384. The light which is reflected back by the pixel electrodes of the active matrix 384 passes through the prism 386 towards the lens system 142. As in the transmissive displays, the LEDs can be flashed sequentially. It is recognized that reflective microdisplay can be used in other embodiments.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A display viewer comprising:
    an electronic display having an array of pixel electrodes having an area of less than 400 mm$^2$;
    a lens that enlarges an image on the display; and
    a curved mirror that reflects the enlarged image from the lens, the curved mirror having an optical axis and a principal focal surface intersecting the optical axis at a focal point.

2. The display viewer of claim 1 wherein the electronic display is an active matrix display and further comprising a light source that illuminates the array of pixel electrodes.

3. The display viewer of claim 2 wherein the microdisplay further comprises a light pipe between the light source and the liquid crystal display.

4. The display viewer of claim 3 wherein the microdisplay further comprises a condenser lens between the light pipe and the liquid crystal display.

5. The display viewer of claim 2 wherein the light source comprises at least one light emitting diode.

6. The display viewer of claim 2 wherein the light source further comprises at least one dichroic filter.

7. The display viewer of claim 1 further comprising a screen for displaying the image projected from the mirror.

8. The display viewer of claim 7 wherein the screen comprises a diffuser and Fresnel lens.

9. The display viewer of claim 7 further comprising a housing:
    the housing carrying the liquid crystal display, the mirror and the screen; the screen pivotably carried by the housing for moving between an open viewing position and a closed stored position; and
    a backlight that illuminates the array of pixel electrodes.

10. The display viewer of claim 9 wherein the mirror is positioned in a range of between 40 millimeters and 50 millimeters from the microdisplay and the mirror is located between 22 millimeters and 30 millimeters from the screen when in an open viewing position.

11. The display viewer of claim 10 wherein the screen for displaying the image is greater than 28 millimeters by 38 millimeters.

12. A display viewer comprising:
    an electronic display including an array of pixel electrodes;
    a lens that enlarges an image on the electronic display; and
    a curved mirror that reflects the enlarged image from the lens, the curved mirror having an optical axis and a principal focal surface intersecting the optical axis at a focal point.

13. A microdisplay viewer comprising:
    a display having an array of at least 35,000 pixel electrodes having an active area of less than 400 mm$_2$;
    a lens that gathers and enlarges the image on the microdisplay; and
    a curved mirror that reflects the enlarged image from the lens, the curved mirror having an optical axis and a principal focal surface intersecting the optical axis at a focal point.

14. The microdisplay viewer of claim 13 wherein the display is an active matrix liquid crystal display and further comprising a light source that illuminates the array of pixel electrodes.

15. The microdisplay viewer of claim 14 wherein the display has an array of at least 75,000 pixel electrodes having an active area of less than 200 mm$^2$.

16. The microdisplay viewer of claim 15 wherein the microdisplay further comprises a light pipe between the light source and the liquid crystal display.

17. The microdisplay viewer of claim 16 wherein the microdisplay further comprises a condenser lens between the light pipe and the liquid crystal display.

18. The microdisplay viewer of claim 14 wherein the light source comprises at least one light emitting diode.

19. The microdisplay viewer of claim 14 wherein the light source further comprises at least one dichroic filter.

20. The microdisplay viewer of claim 14 further comprising a screen for displaying the image projected from the mirror.

21. The microdisplay viewer of claim 20 wherein the screen comprises a diffuser and Fresnel lens.

22. The microdisplay viewer of claim 20 further comprising:
    a housing, the housing carrying the liquid crystal display, the mirror and the screen; the screen pivotably carried by the housing for moving between an open viewing position and a closed stored position; and
    where the light source is a backlight that illuminates the array of pixel electrodes.

23. The microdisplay viewer of claim 22 wherein the mirror is positioned in a range of between 40 millimeters and 50 millimeters from the microdisplay and the mirror is located between 22 millimeters and 30 millimeters from the screen when in an open viewing position.

24. The microdisplay viewer of claim 23 wherein the screen for displaying the image is greater than 28 millimeters by 38 millimeters.

25. A microdisplay viewer comprising:

a display having an array of at least 35,000 pixel electrodes having an active area of less than 400 mm$^2$;

a lens that gathers and enlarges the image on the microdisplay;

a screen that displays the enlarged image from the lens; and a folding mirror interposed between the lens and the screen to reflect the enlarged image from the lens to the screen.

26. The microdisplay viewer of claim 25 wherein the screen is a Fresnel lens.

27. The microdisplay viewer of claim 25 wherein the screen is a combination Fresnel lens and a diffuser.

28. A microdisplay viewer comprising:

an active matrix liquid crystal display including an array of at least 75,000 pixel electrodes, the array of pixel electrodes having an active area of less than 200 mm$^2$;

a light source that illuminates the array of pixel electrodes;

a lens that enlarges an image on the microdisplay; and a curved mirror that reflects the enlarged image from the lens, the curved mirror having an optical axis and a principal focal surface intersecting the optical axis at a focal point.

29. The microdisplay viewer of claim 28 wherein the active matrix liquid crystal display is a color sequential display.

30. The microdisplay viewer of claim 29 wherein the array of pixel electrodes has an active area of less than 158 mm$^2$.

31. The microdisplay viewer of claim 28 wherein the microdisplay further comprises a light pipe between the light source and the liquid crystal display.

32. The microdisplay viewer of claim 31 wherein the microdisplay further comprises a condenser lens between the light pipe and the liquid crystal display.

33. The microdisplay viewer of claim 28 wherein the light source comprises a light emitting diode.

34. The microdisplay viewer of claim 28 wherein the light source further comprises at least one dichroic filter.

35. The microdisplay viewer of claim 28 wherein the plane of the microdisplay is maintained at a non-perpendicular angle to the optical axis of the concave mirror.

36. The microdisplay viewer of claim 28 wherein the concave mirror is a parabolic mirror so that the focal surface and the corresponding surface are both planes perpendicular to the optic axis.

37. The microdisplay viewer of claim 28 further comprising a digital camera.

38. The microdisplay viewer of claim 28 wherein the viewer further comprises a wired link for connecting to a cellular telephone having:

a telephone housing having a plurality of control elements;

an active matrix liquid crystal display within the housing and including an array of at least 75,000 pixel electrodes, the array of pixel electrodes having an active area of less than 158 mm$^2$;

a light emitting diode device that illuminates the array of pixel electrodes; and a lens positioned to receive an image formed on the active matrix liquid crystal display and that magnifies the image.

39. The microdisplay viewer of claim 28 wherein the viewer further comprises a wired link for connecting to a wireless pager having:

a housing having a plurality of control elements;

a wireless receiver within the housing that receives data from a source;

a display circuit connected to the wireless receiver;

a matrix display mounted to the housing and that displays an image from the circuit, the matrix display having at least 75,000 pixel electrodes defining an active area of less that 160 mm$^2$; and the housing comprises a first display port for the matrix display and a second display port for viewing an alphanumeric display.

40. A cellular telephone comprising:

a telephone housing having a plurality of control elements;

an active matrix liquid crystal display within the housing and including an array of at least 75,000 pixel electrodes, the array of pixel electrodes having an active area of less than 158 mm$^2$;

a light emitting diode device that illuminates the array of pixel electrodes;

a lens positioned to receive an image formed on the active matrix liquid crystal display and magnify the image; and a curved mirror that reflects the magnified image from the lens, the curved mirror having an optical axis and a principal focal surface intersecting the optical axis at a focal point.

41. A wireless pager comprising:

a housing having a plurality of control elements;

a wireless receiver within the housing that receives data from a source;

a display circuit connected to the wireless receiver;

a matrix display mounted to the housing and that displays an image from the circuit, the matrix display having at least 75,000 pixel electrodes defining an active area of less than 160 mm$^2$;

a light emitting diode device that illuminates the array of pixel electrodes;

a lens that gathers and enlarges the image on the microdisplay; and a curved mirror that reflects the enlarged image from the lens, the curved mirror having an optical axis and a principal focal surface intersecting the optical axis at a focal point, the housing having a first display port for the matrix display and a second display port for viewing an alphanumeric display.

* * * * *

UNITED STATES PATENT AND TRADEMARK OFFICE
CERTIFICATE OF CORRECTION

PATENT NO. : 6,452,577 B1
DATED : September 17, 2002
INVENTOR(S) : Ronald P. Gale and Gary J. Swanson It is certified that error appears in the above-identified patent and that said Letters Patent is hereby corrected as shown below:

Column 12,
Line 28, delete "$mm_2$" and insert -- $mm^2$ --
Line 53, delete "14" and insert -- 13 --

Column 13,
Line 55, delete "optic" and insert -- optical --

Column 14,
Line 20, delete "that" and insert -- than --

Signed and Sealed this

Eleventh Day of March, 2003

JAMES E. ROGAN
*Director of the United States Patent and Trademark Office*